(12) United States Patent
Hagersten et al.

(10) Patent No.: US 6,332,165 B1
(45) Date of Patent: Dec. 18, 2001

(54) MULTIPROCESSOR COMPUTER SYSTEM EMPLOYING A MECHANISM FOR ROUTING COMMUNICATION TRAFFIC THROUGH A CLUSTER NODE HAVING A SLICE OF MEMORY DIRECTED FOR PASS THROUGH TRANSACTIONS

(75) Inventors: Erik E. Hagersten, Palo Alto, CA (US); Christopher J. Jackson, Westford; Hien Nguyen, Auburndale, both of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/148,736

(22) Filed: Sep. 4, 1998

Related U.S. Application Data

(63) Continuation-in-part of application No. 08/924,385, filed on Sep. 5, 1997.

(51) Int. Cl.$^7$ .......................... G06F 15/173; G06F 15/16
(52) U.S. Cl. ......................... 709/238; 709/200; 709/245; 709/251
(58) Field of Search ............................ 370/54; 395/309; 709/238, 251, 245, 217, 213, 212, 200

(56) References Cited

U.S. PATENT DOCUMENTS

| | | |
|---|---|---|
| 4,164,787 | 8/1979 | Aranguren . |
| 5,392,280 | * 2/1995 | Zheng ................................. 370/353 |

(List continued on next page.)

FOREIGN PATENT DOCUMENTS

| | | |
|---|---|---|
| 0 029 975 A2 | 6/1981 | (EP) . |
| 0 187 518 A2 | 7/1986 | (EP) . |

(List continued on next page.)

OTHER PUBLICATIONS

First Written Opinion for Application No. PCT/US98/18466 mailed Jun. 30, 1999.

(List continued on next page.)

*Primary Examiner*—Mark H. Rinehart
*Assistant Examiner*—Paul Kang
(74) *Attorney, Agent, or Firm*—Conley, Rose & Tayon, PC; B. Noël Kivlin

(57) ABSTRACT

A multiprocessing computer system includes a plurality of nodes interconnected through a global interconnect network which supports cluster communications. An initiating node may launch a request to a remote node's memory. A remote cluster node may be reached by passing the request through one or more intermediate nodes configured in pass-through mode. Accordingly, various global network topologies may be supported. The pass-through mode may be advantageously accommodated using a node having hardware which is similar to other nodes in the system. More particularly, the pass through mechanism may be implemented without significantly altering a node's local bus transactions. In one specific implementation, when the system interface of a particular node receives a transaction, the address of the transaction is checked to determine if the transaction should be treated as a pass through transaction. Transactions of selected address regions may be specified as being pass through transactions during system initialization. When a transaction is identified as a pass through transaction, the system interface initiates a corresponding transaction on the local bus of the interface, with an indication that this transaction is a pass through transaction. The same interface or another interface may responsively reconvey the transaction upon another channel of the global network to thereby convey the transaction to its destination. In one embodiment, a pass through transaction is indicated on the local bus by clearing an MSB of the address for the transaction. In other respects, the transaction conveyed on the local bus is similar to other local bus transactions. Other unused fields of the local bus during the transaction may alternatively be used to indicate a pass through operation. Accordingly, the hardware of the node need not be significantly modified to support the pass through operations. Error messages from a remote node may be further conveyed through the pass through node to the initiating node.

19 Claims, 13 Drawing Sheets

U.S. PATENT DOCUMENTS

| | | | |
|---|---|---|---|
| 5,452,292 | * 9/1995 | Okanoue et al. | 370/403 |
| 5,590,345 | 12/1996 | Barker et al. | 712/11 |
| 5,765,011 | 6/1998 | Wilkinson et al. | 712/20 |
| 5,794,059 | 8/1998 | Barker et al. | 712/10 |
| 5,842,031 | 11/1998 | Barker et al. | 712/23 |
| 5,862,357 | 1/1999 | Hagersten et al. | 710/129 |
| 5,992,290 | * 11/1999 | Quebedeaux et al. | 89/1.56 |
| 6,055,613 | * 4/2000 | Parady | 711/165 |

FOREIGN PATENT DOCUMENTS

| | | |
|---|---|---|
| 0 288 636 A2 | 11/1988 | (EP) . |
| 0 288 636 A3 | 11/1988 | (EP) . |
| 0 780 769 | 6/1997 | (EP) . |

OTHER PUBLICATIONS

*VIC 8251F, VIC TO VME Interface with Mirrored Memory, User's Manual version 1.1*,Creative Electronic Systems SA, Jun. 1994.

Agarwal et al., "Column–Associative Caches: A Technique for Reducing the Miss Rate of Direct–Mapped Caches," Proceedings of the Annual International Symposium on Computer Architecture, May 1993, pp. 179–190.

Seznec, "About Set and Skewed Associativity on Second–Level Caches," Proceedings of the International Conference on Computer Design: VLSI in Computers and Processors, Oct. 1993, pp. 40–43.

Patent Abstract of Germany for German Patent No. DE 40 34 444 A1, http://www.Dialogweb.com, May 13, 1999.

International Search Report for PCT/US 98/18466 mailed Feb. 15, 1999.

* cited by examiner

| V | WB | Owner | Sharers |
|---|----|-------|---------|
| 73 | 75 | 77 | 79 |

MULTIPROCESSOR COMPUTER SYSTEM EMPLOYING A MECHANISM FOR ROUTING COMMUNICATION TRAFFIC THROUGH A CLUSTER NODE HAVING A SLICE OF MEMORY DIRECTED FOR PASS THROUGH TRANSACTIONS

CROSS REFERENCE TO RELATED PATIENT APPLICATIONS

This patent application is a continuation-in-part of copending, commonly assigned patent application Ser. No. 08/924,385, "Hierarchical Computer System" by Erik E. Hagersten, filed Sep. 5, 1997, the disclosure of which is incorporated herein by reference in its entirety.

BACKGROUND OF THE INVENTION

1. Field of the Invention

This invention relates to the field of multiprocessor computer systems and, more particularly, to multiprocessor computer systems which operate in a cluster mode to provide fault isolation.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

Another approach for implementing multiprocessing computer systems is a scalable shared memory (SSM) architecture (also referred to as a distributed shared memory architecture). An SSM architecture includes multiple nodes within which processors and memory reside. The multiple nodes communicate via a network coupled therebetween. When considered as a whole, the memory included within the multiple nodes forms the shared memory for the computer system. Typically, directories are used to identify which nodes have cached copies of data corresponding to a particular address. Coherency activities may be generated via examination of the directories.

SSM systems are scaleable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

In a typical SSM system, a global domain is created by way of the SSM protocol which makes all the memory attached to the global domain look like one shared memory accessible to all of its processors. A global domain typically runs a single kernel. Hardware provides conventional MMU (memory management unit) protection, and the kernel manages mappings (e.g. reloading of key registers on context switches) to allow user programs to co-exist without trusting one another. Since the nodes of a global domain share memory and may cache data, a software error in one node may create a fatal software error which may crash the entire system. Similarly, a fatal hardware error in one node will typically cause the entire global domain to crash.

Accordingly, in another approach to multiprocessing computer systems, clustering may be employed to provide greater fault protection. Unlike SSM approaches, the memory of one node in a cluster system is not freely accessible by processors of other cluster nodes. Likewise, the I/O of one node is typically not freely accessible by processors of other nodes. While memory is not freely shared between nodes of a cluster, a cluster allows nodes to communicate with each other in a protected way using an interconnection network which is virtualized and protected via operating system abstractions. Normally, each node of a cluster runs a separate kernel. Nodes connected in a cluster should not be able to spread local faults, both hardware and software, that would crash other nodes.

While the concept of clustering for providing protection in multiprocessing computer systems is generally known, various limitations have been associated with cluster systems. These limitations include the lack of addressing schemes which cover a large number of nodes, the lack of flexible protection mechanisms that protect a node from software and hardware failures in other nodes, the lack of protocols which are extensible that allow communications to be set up as "hops" through other nodes to thereby allow efficient interconnect networks, and the lack of error reporting mechanisms that are applicable to protocols running at a user-level.

Cluster systems can use many varied network topologies, each of which has benefits and drawbacks. One potential topology which is well-suited for many applications uses a central switching element to distribute cluster network traffic. Since this topology is useful, it is commonly implemented in cluster configurations. However, many implementations of switches have a serious drawback, which is related to their cost.

Since a switch could potentially connect many separate SMPs together, customers will require many fewer switches than SMPs. This means that customized switch hardware will be produced in lower volume, and will thus be more expensive than the SMP hardware. In addition, the development costs for the custom technology needed for a switch are generally substantial.

It is thus desirable to provide a fast and reliable communication mechanism in a cluster system which allows for efficient implementation of user and kernel-level communication protocols. It is further desirable to provide a flexible and inexpensive mechanism for use in a cluster system for distributing cluster network traffic.

SUMMARY OF THE INVENTION

In one embodiment, a multiprocessing computer system includes a plurality of nodes. The plurality of nodes may be interconnected through a global interconnect network which supports cluster communications. An initiating node may launch a request to a remote node's memory. A remote cluster node may be reached by passing the request through one or more intermediate nodes configured in pass-through mode. Accordingly, various global network topologies may be supported.

The pass-through mode may be advantageously accommodated using a node having hardware which is similar to other nodes in the system. More particularly, the pass through mechanism may be implemented without significantly altering a node's local bus transactions. In one specific implementation, when the system interface of a particular node receives a transaction, the address of the transaction is checked to determine if the transaction should be treated as a pass through transaction. Transactions of selected address regions may be specified as being pass through transactions during system initialization. When a transaction is identified as a pass through transaction, the system interface initiates a corresponding transaction on the local bus of the interface, with an indication that this transaction is a pass through transaction. The same interface or another interface may responsively reconvey the transaction upon another channel of the global network to thereby convey the transaction to its destination. In one embodiment, a pass through transaction is indicated on the local bus by clearing an MSB of the address for the transaction. In other respects, the transaction conveyed on the local bus is similar to other local bus transactions. Other unused fields of the local bus during the transaction may alternatively be used to indicate a pass through operation. Accordingly, the hardware of the node need not be significantly modified to support the pass through operations, thereby minimizing the costs of the switch. Error messages from a remote node may be further conveyed through the pass through node to the initiating node.

BRIEF DESCRIPTION OF THE DRAWINGS

Other objects and advantages of the invention will become apparent upon reading the following detailed description and upon reference to the accompanying drawings in which:

FIG. 2A is an exemplary directory entry stored in one embodiment of a directory depicted in FIG. 2.

Figure 1:
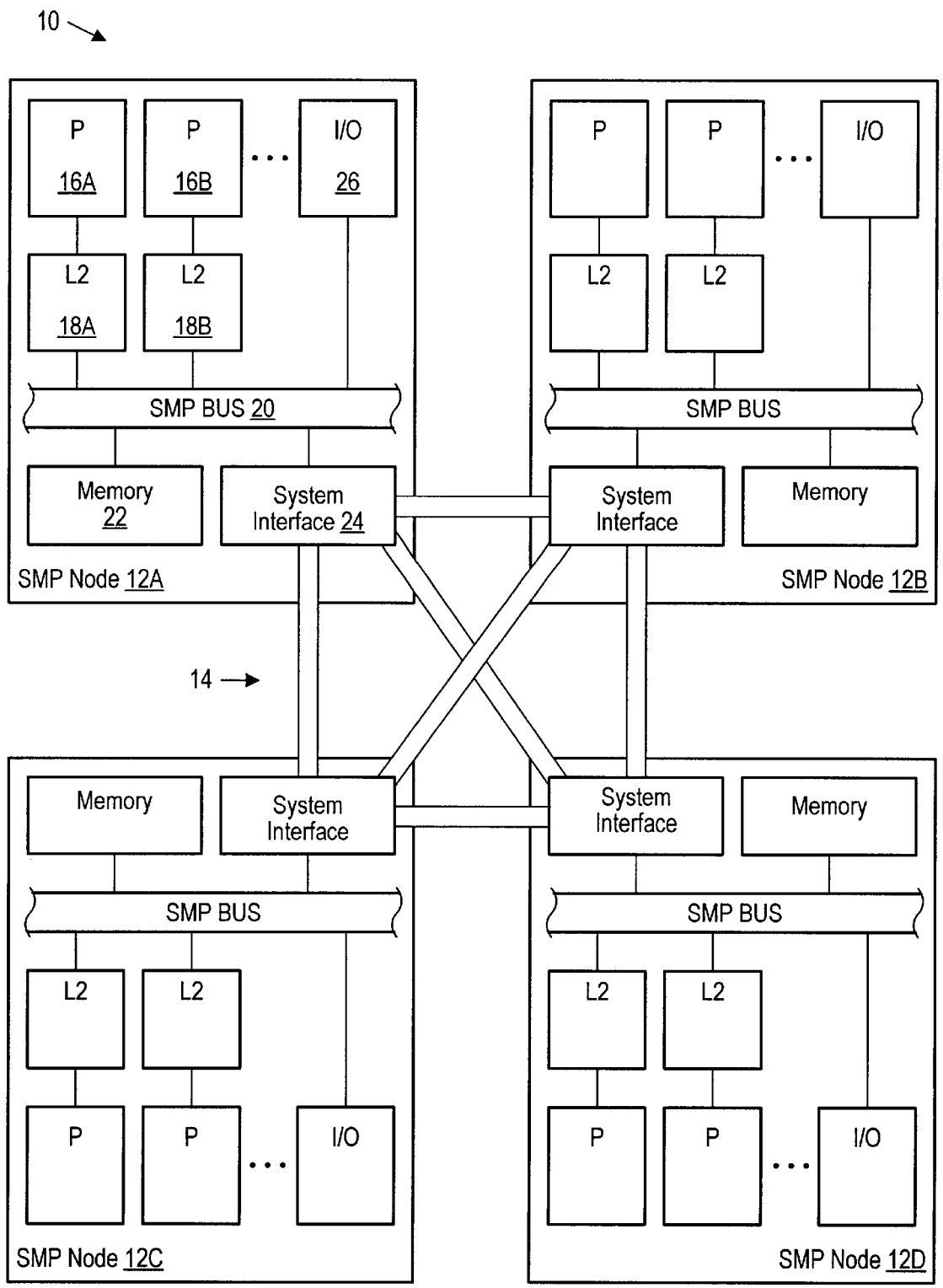
FIG. 1 is a block diagram of a multiprocessor computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a multiprocessing computer system 10 is shown. Computer system 10 includes multiple SMP nodes 12A–12D interconnected by a point-to-point network 14. Elements referred to herein with a particular reference number followed by a letter will be collectively referred to by the reference number alone. For example, SMP nodes 12A–12D will be collectively referred to as SMP nodes 12. In the embodiment shown, each SMP node 12 includes multiple processors, external caches, an SMP bus, a memory, and a system interface. For example, SMP node 12A is configured with multiple processors including processors 16A–16B. The processors 16 are connected to external caches 18, which are further coupled to an SMP bus 20. Additionally, a memory 22 and a system interface 24 are coupled to SMP bus 20. Still further, one or more input/output (I/O) interfaces 26 may be coupled to SMP bus 20. I/O interfaces 26 are used to interface to peripheral devices such as serial and parallel ports, disk drives, modems, printers, etc. Other SMP nodes 12B–12D may be configured similarly.

Generally speaking, computer system 10 is operable in either a scaled shared memory (SSM) mode or in a cluster mode. The mode in which computer system 10 operates is set during initialization by setting configuration control registers within each node's system interface 24. Various specific details regarding the operation of computer system 10 in the SSM mode are described first in conjunction with FIGS. 2–3. Aspects of the operation of computer system 10 in cluster mode are described more fully in conjunction with FIGS. 4–10.

As used herein, a memory operation is an operation causing the transfer of data from a source to a destination. The source and/or destination may be storage locations within the initiator, or may be storage locations within memory. When a source or destination is a storage location within memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In the computer system shown in FIG. 1, a memory operation may include one or more transactions upon SMP bus 20 as well as one or more coherency operations upon network 14.

Each SMP node 12 is essentially an SMP system having memory 22 as the shared memory. Processors 16 are high performance processors. In one embodiment, each processor 16 is a SPARC processor compliant with version 9 of the SPARC processor architecture. It is noted, however, that any processor architecture may be employed by processors 16.

Typically, processors 16 include internal instruction and data caches. Therefore, external caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. External caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18.

SMP bus 20 accommodates communication between processors 16 (through caches 18), memory 22, system interface 24, and I/O interface 26. In one embodiment, SMP bus 20 includes an address bus and related control signals, as well as a data bus and related control signals. Because the address and data buses are separate, a split-transaction bus protocol may be employed upon SMP bus 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

Memory 22 is configured to store data and instruction code for use by processors 16. Memory 22 preferably comprises dynamic random access memory (DRAM), although any type of memory may be used. In the SSM mode, memory 22 in conjunction with the similar illustrated memories in the other SMP nodes 12 form a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between SMP nodes 12 as well as among processors 16 and caches 18 within a particular SMP node 12A–12D. System interface 24 provides internode coherency, while snooping upon SMP bus 20 provides intranode coherency.

In addition to maintaining internode coherency, system interface 24 detects addresses upon SMP bus 20 which require a data transfer to or from another SMP node 12. System interface 24 performs the transfer, and provides the corresponding data for the transaction upon SMP bus 20. In the embodiment shown, system interface 24 is coupled to a point-to-point network 14. However, it is noted that in alternative embodiments other networks may be used. In a point-to-point network, individual connections exist between each node upon the network. A particular node communicates directly with a second node via a dedicated link. To communicate with a third node, the particular node utilizes a different link than the one used to communicate with the second node. Alternatively, as will be described in further detail below, the interconnect network 38 may be configured such that a particular node may be used as a "hop" to pass through communications between a sending node and a receiving node. That is, the network is arranged such that all communications from the sending node to the receiving node must pass through a hop node. By configuring the network using hop nodes, the cost of the system may be reduced, and the interconnect network may be simplified.

It is noted that, although four SMP nodes 12 are shown in FIG. 1, embodiments of computer system 10 employing any number of nodes are contemplated. It is further noted that embodiments are also contemplated wherein a plurality of nodes are configured to operate in an SSM mode of operation with respect to each other, but that collectively form a cluster node within a cluster which includes other cluster nodes.

Figure 1A:
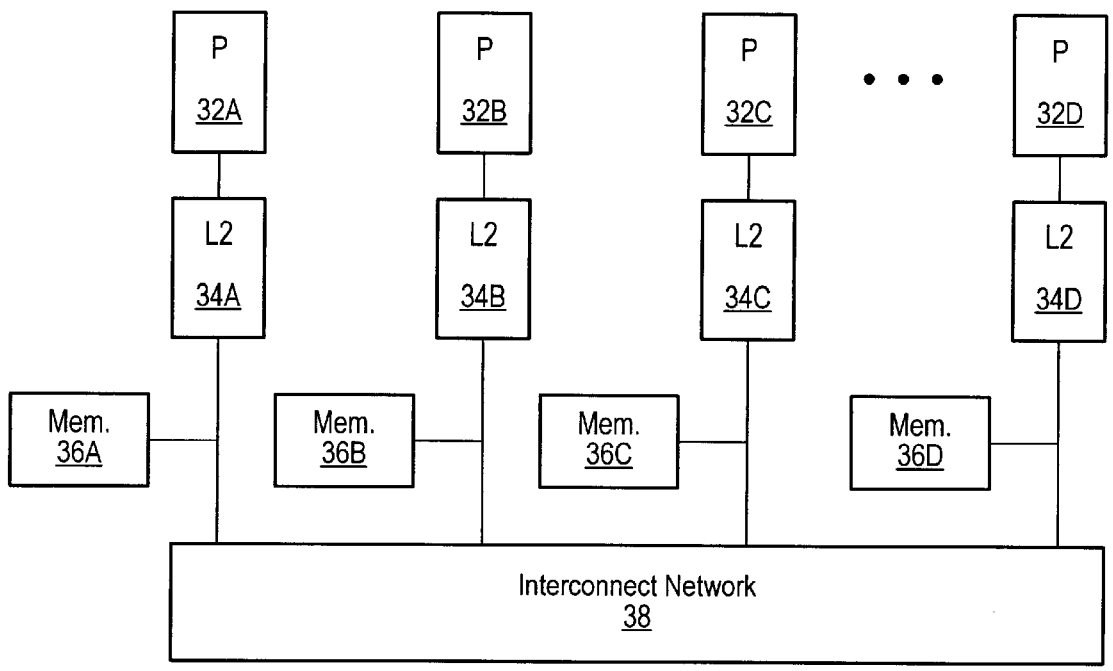
FIG. 1A is a conceptualized block diagram depicting a non-uniform memory architecture supported by one embodiment of the computer system shown in FIG. 1.
Figure 1B:
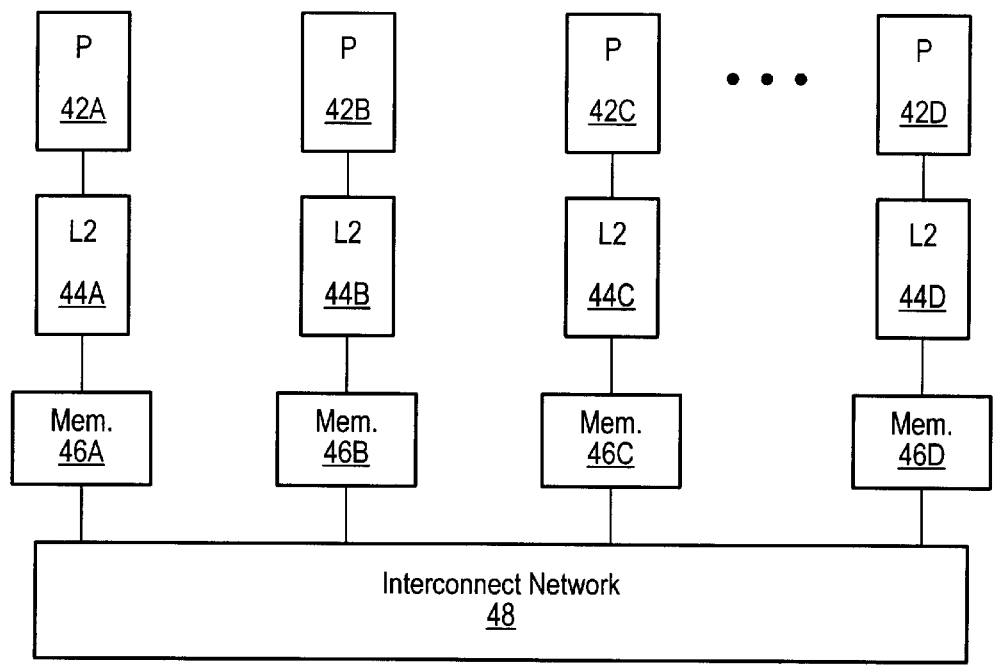
FIG. 1B is a conceptualized block diagram depicting a cache-only memory architecture supported by one embodiment of the computer system shown in FIG. 1.

FIGS. 1A and 1B are conceptualized illustrations of distributed memory architectures supported by one embodiment of computer system 10. Specifically, FIGS. 1A and 1B illustrate alternative ways in which each SMP node 12 of FIG. 1 may cache data and perform memory accesses. Details regarding the manner in which computer system 10 supports such accesses will be described in further detail below.

FIG. 1A is a logical diagram depicting a first memory architecture 30 supported by one embodiment of computer system 10 is shown. Architecture 30 includes multiple processors 32A–32D, multiple caches 34A–34D, multiple memories 36A–36D, and an interconnect network 38. The multiple memories 36 form a distributed shared memory. Each address within the address space corresponds to a location within one of memories 36.

Architecture 30 is a non-uniform memory architecture (NUMA). In a NUMA architecture, the amount of time required to access a first memory address may be substantially different than the amount of time required to access a second memory address. The access time depends upon the origin of the access and the location of the memory 36A–36D which stores the accessed data. For example, if processor 32A accesses a first memory address stored in memory 36A, the access time may be significantly shorter than the access time for an access to a second memory address stored in one of memories 36B–36D. That is, an access by processor 32A to memory 36A may be completed locally (e.g. without transfers upon network 38), while a processor 32A access to memory 36B is performed via network 38. Typically, an access through network 38 is slower than an access completed within a local memory. For example, a local access might be completed in a few hundred nanoseconds while an access via the network might occupy a few microseconds.

Data corresponding to addresses stored in remote nodes may be cached in any of the caches 34. However, once a cache 34 discards the data corresponding to such a remote address, a subsequent access to the remote address is completed via a transfer upon network 38.

NUMA architectures may provide excellent performance characteristics for software applications which use addresses that correspond primarily to a particular local memory. Software applications which exhibit more random access patterns and which do not confine their memory accesses to addresses within a particular local memory, on the other hand, may experience a large amount of network traffic as a particular processor 32 performs repeated accesses to remote nodes.

Turning now to FIG. 1B, a logic diagram depicting a second memory architecture 40 supported by the computer system 10 of FIG. 1 is shown. Architecture 40 includes multiple processors 42A–42D, multiple caches 44A–44D, multiple memories 46A–46D, and network 48. However, memories 46 are logically coupled between caches 44 and network 48. Memories 46 serve as larger caches (e.g. a level 3 cache), storing addresses which are accessed by the corresponding processors 42. Memories 46 are said to "attract" the data being operated upon by a corresponding processor 42. As opposed to the NUMA architecture shown in FIG. 1A, architecture 40 reduces the number of accesses upon the network 48 by storing remote data in the local memory when the local processor accesses that data. The remote data stored in local memory is referred to herein as shadow pages of the remote data.

Architecture 40 is referred to as a cache-only memory architecture (COMA). Multiple locations within the distributed shared memory formed by the combination of memories 46 may store data corresponding to a particular address. No permanent mapping of a particular address to a particular storage location is assigned. Instead, the location storing data corresponding to the particular address changes dynamically based upon the processors 42 which access that particular address. Conversely, in the NUMA architecture a particular storage location within memories 46 is assigned to a particular address. Architecture 40 adjusts to the memory access patterns performed by applications executing thereon, and coherency is maintained between the memories 46.

During operation in a SSM mode, computer system 10 may be configured to support both of the memory architectures shown in FIGS. 1A and 1B. In particular, a memory address may be accessed in a NUMA fashion from one SMP node 12A–12D while being accessed in a COMA manner from another SMP node 12A–12D. In one embodiment, a NUMA access is detected if the node ID bits of the address upon SMP bus 20 identify another SMP node 12 as the home node of the address presented. Otherwise, a COMA access is presumed. Additional details will be provided below. In one embodiment, a data accessed in a COMA manner is stored as a shadow page within the node accessing the data.

In one embodiment, the COMA architecture is implemented using a combination of hardware and software techniques. Hardware maintains coherency between the locally cached copies of pages, and software (e.g. the operating system employed in computer system 10) is responsible for deallocating and allocating cached pages.

Figure 2:
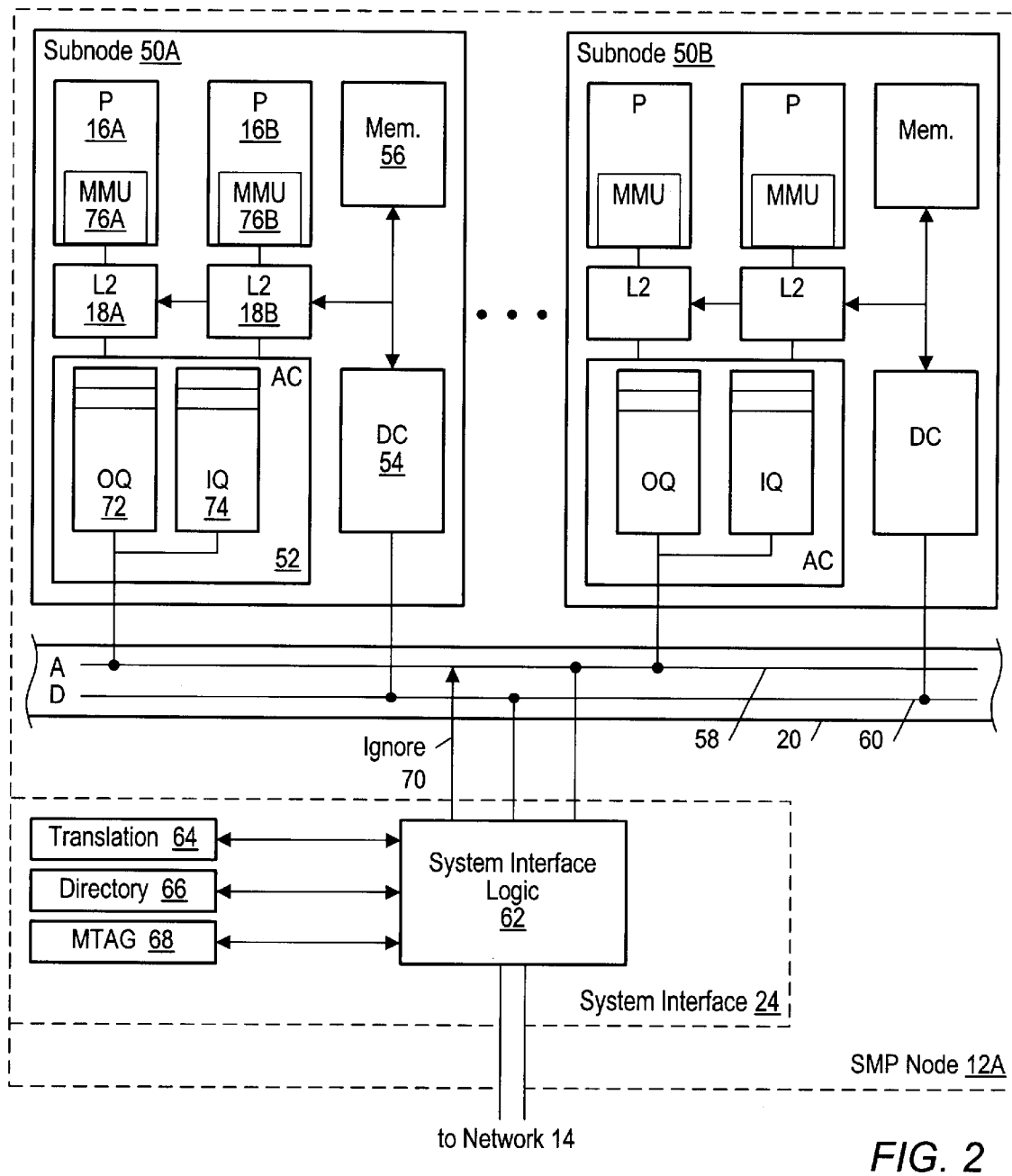
FIG. 2 is a block diagram of one embodiment of a symmetric multiprocessing node depicted in FIG. 1.

FIG. 2 depicts details of one implementation of an SMP node 12A that generally conforms to the SMP node 12A shown in FIG. 1. Other nodes 12 may be configured similarly. It is noted that alternative specific implementations of each SNIP node 12 of FIG. 1 are also possible. The implementation of SMP node 12A shown in FIG. 2 includes multiple subnodes such as subnodes 50A and 50B. Each subnode 50 includes two processors 16 and corresponding caches 18, a memory portion 56, an address controller 52, and a data controller 54. The memory portions 56 within subnodes 50 collectively form the memory 22 of the SMP node 12A of FIG. 1. Other subnodes (not shown) are further coupled to SMP bus 20 to form the I/O interfaces 26.

As shown in FIG. 2, SMP bus 20 includes an address bus 58 and a data bus 60. Address controller 52 is coupled to address bus 58, and data controller 54 is coupled to data bus 60. FIG. 2 also illustrates system interface 24, including a system interface logic block 62, a translation storage 64, a directory 66, and a memory tag (MTAG) 68. Logic block 62 is coupled to both address bus 58 and data bus 60, and asserts an ignore signal 70 upon address bus 58 under certain circumstances as will be explained further below. Additionally, logic block 62 is coupled to translation storage 64, directory 66, MTAG 68, and network 14.

For the embodiment of FIG. 2, each subnode 50 is configured upon a printed circuit board which may be inserted into a backplane upon which SMP bus 20 is situated. In this manner, the number of processors and/or I/O interfaces 26 included within an SMP node 12 may be varied by inserting or removing subnodes 50. For example, computer system 10 may initially be configured with a small number of subnodes 50. Additional subnodes 50 may be added from time to time as the computing power required by the users of computer system 10 grows.

Address controller 52 provides an interface between caches 18 and the address portion of SMP bus 20. In the embodiment shown, address controller 52 includes an out queue 72 and some number of in queues 74. Out queue 72 buffers transactions from the processors connected thereto until address controller 52 is granted access to address bus 58. Address controller 52 performs the transactions stored in out queue 72 in the order those transactions were placed into out queue 72 (i.e. out queue 72 is a FIFO queue). Transactions performed by address controller 52 as well as transactions received from address bus 58 which are to be snooped by caches 18 and caches internal to processors 16 are placed into in queue 74.

Similar to out queue 72, in queue 74 is a FIFO queue. All address transactions are stored in the in queue 74 of each subnode 50 (even within the in queue 74 of the subnode 50 which initiates the address transaction). Address transactions are thus presented to caches 18 and processors 16 for snooping in the order they occur upon address bus 58. The order that transactions occur upon address bus 58 is the order for SMP node 12A. However, the complete system is expected to have one global memory order. This ordering expectation creates a problem in both the NUMA and COMA architectures employed by computer system 10, since the global order may need to be established by the order of operations upon network 14. If two nodes perform a transaction to an address, the order that the corresponding coherency operations occur at the home node for the address defines the order of the two transactions as seen within each node. For example, if two write transactions are performed to the same address, then the second write operation to arrive at the address' home node should be the second write transaction to complete (i.e. a byte location which is updated by both write transactions stores a value provided by the second write transaction upon completion of both transactions). However, the node which performs the second transaction may actually have the second transaction occur first upon SMP bus 20. Ignore signal 70 allows the second transaction to be transferred to system interface 24 without the remainder of the SMP node 12 reacting to the transaction.

Therefore, in order to operate effectively with the ordering constraints imposed by the out queue/in queue structure of address controller 52, system interface logic block 62 employs ignore signal 70. When a transaction is presented upon address bus 58 and system interface logic block 62 detects that a remote transaction is to be performed in response to the transaction, logic block 62 asserts the ignore signal 70. Assertion of the ignore signal 70 with respect to a transaction causes address controller 52 to inhibit storage of the transaction into in queues 74. Therefore, other transactions which may occur subsequent to the ignored transaction and which complete locally within SMP node 12A may complete out of order with respect to the ignored transaction without violating the ordering rules of in queue 74. In particular, transactions performed by system interface 24 in response to coherency activity upon network 14 may be performed and completed subsequent to the ignored transaction. When a response is received from the remote transaction, the ignored transaction may be reissued by system interface logic block 62 upon address bus 58. The transaction is thereby placed into in queue 74, and may complete in order with transactions occurring at the time of reissue.

It is noted that in one embodiment, once a transaction from a particular address controller 52 has been ignored, subsequent coherent transactions from that particular address controller 52 are also ignored. Transactions from a particular processor 16 may have an important ordering relationship with respect to each other, independent of the ordering requirements imposed by presentation upon address bus 58. For example, a transaction may be separated from another transaction by a memory synchronizing instruction such as the MEMBAR instruction included in the SPARC architecture. The processor 16 conveys the transactions in the order the transactions are to be performed with respect to each other. The transactions are ordered within out queue 72, and therefore the transactions originating from a particular out queue 72 are to be performed in order. Ignoring subsequent transactions from a particular address controller 52 allows the in-order rules for a particular out queue 72 to be preserved. It is further noted that not all transactions from a particular processor must be ordered. However, it is difficult to determine upon address bus 58 which transactions must be ordered and which transactions may not be ordered. Therefore, in this implementation, logic block 62 maintains the order of all transactions from a particular out queue 72. It is noted that other implementations of subnode 50 are possible that allow exceptions to this rule.

Data controller 54 routes data to and from data bus 60, memory portion 56 and caches 18. Data controller 54 may include in and out queues similar to address controller 52. In one embodiment, data controller 54 employs multiple physical units in a byte-sliced bus configuration.

Processors 16 as shown in FIG. 2 include memory management units (MMUs) 76A–76B. MMUs 76 perform a virtual to physical address translation upon the data addresses generated by the instruction code executed upon processors 16, as well as the instruction addresses. The addresses generated in response to instruction execution are virtual addresses. In other words, the virtual addresses are the addresses created by the programmer of the instruction code. The virtual addresses are passed through an address translation mechanism (embodied in MMUs 76), from which corresponding physical addresses are created. The physical address identifies a storage location within memory 22.

Virtual to physical address translation is performed for many reasons. For example, the address translation mechanism may be used to grant or deny a particular computing task's access to certain memory addresses. In this manner, the data and instructions within one computing task are isolated from the data and instructions of another computing task. Additionally, portions of the data and instructions of a computing task may be "paged out" to a hard disk drive. When a portion is paged out, the translation is invalidated. Upon access to the portion by the computing task, an interrupt occurs due to the failed translation. The interrupt allows the operating system to retrieve the corresponding information from the hard disk drive. In this manner, more virtual memory may be available than actual memory in memory 22. Many other uses for virtual memory are well known.

Referring back to computer system 10 shown in FIG. 1 in conjunction with the SMP node 12A implementation illustrated in FIG. 2, in the SSM mode, the physical address computed by MMUs 76 may be a local physical address (LPA) which identifies an address for which the SMP node 12 is the home node, or it may be a global address (GA). MTAG 68 stores a coherency state for each "coherency unit" in memory 22. When an address transaction is performed upon SMP bus 20, system interface logic block 62 examines the coherency state stored in MTAG 68 for the accessed coherency unit. If the coherency state indicates that the SMP node 12 has sufficient access rights to the coherency unit to perform the access, then the address transaction proceeds. If, however, the coherency state indicates that coherency operations should be performed prior to completion of the transaction, then system interface logic block 62 asserts the ignore signal 70. Logic block 62 performs coherency operations upon network 14 to acquire the appropriate coherency state. When the appropriate coherency state is acquired, logic block 62 reissues the ignored transaction upon SMP bus 20. Subsequently, the transaction completes.

Generally speaking, the coherency state maintained for a coherency unit at a particular storage location (e.g. a cache or a memory 22) indicates the access rights to the coherency unit at that SMP node 12. The access right indicates the validity of the coherency unit, as well as the read/write permission granted for the copy of the coherency unit within that SMP node 12. In one embodiment, the coherency states employed by computer system 10 are modified, owned, shared, and invalid. The modified state indicates that the SMP node 12 has updated the corresponding coherency unit. Therefore, other SMP nodes 12 do not have a copy of the coherency unit. Additionally, when the modified coherency unit is discarded by the SMP node 12, the coherency unit is stored back to the home node. The owned state indicates that the SMP node 12 is responsible for the coherency unit, but other SMP nodes 12 may have shared copies. Again, when the coherency unit is discarded by the SMP node 12, the coherency unit is stored back to the home node. The shared state indicates that the SMP node 12 may read the coherency unit but may not update the coherency unit without acquiring the owned state. Additionally, other SMP nodes 12 may have copies of the coherency unit as well. Finally, the invalid state indicates that the SMP node 12 does not have a copy of the coherency unit. In one embodiment, the modified state indicates write permission and any state but invalid indicates read permission to the corresponding coherency unit.

As used herein, a coherency unit is a number of contiguous bytes of memory which are treated as a unit for coherency purposes. For example, if one byte within the coherency unit is updated, the entire coherency unit is considered to be updated. In one specific embodiment, the coherency unit is a cache line, comprising 64 contiguous bytes. It is understood, however, that a coherency unit may comprise any number of bytes.

System interface 24 also includes a translation mechanism which utilizes translation storage 64 to store translations from a local physical address (LPA) to a global address (GA). Certain bits within a physical address identify the home node for the address, at which coherency information is stored for that global address. For example, an embodiment of computer system 10 may employ four SMP nodes 12 such as that of FIG. 1. In such an embodiment, two bits of the physical address identify the home node. Preferably, bits from the most significant portion of the physical address are used to identify the home node. The same bits are used in the physical address to identify NUMA accesses. If the bits of the physical address indicate that the local node is not the home node, then the physical address is a global address and the transaction is performed in NUMA mode. Therefore, the operating system places global addresses in MMUs 76 for any NUMA-type pages. Conversely, the operating system places LPAs in MMU 76 for any COMA-type pages. It is noted that a local address (on SMP bus 20) may equal a GA (for NUMA accesses as well as for global addresses whose home is within the memory 22 in the node in which the local address is presented). Alternatively, a local address may be translated to a GA when the local address identified storage locations used for storing copies of data having a home in another SMP node 12.

In the SSM mode, the directory 66 of a particular home node identifies which SMP nodes 12 have copies of data corresponding to a given physical address assigned to the home node such that coherency between the copies may be maintained. Additionally, the directory 66 of the home node identifies the SMP node 12 which owns the coherency unit. Therefore, while local coherency between caches 18 and processors 16 is maintained via snooping, system-wide (or global) coherency is maintained using MTAG 68 and directory 66. Directory 66 stores the coherency information corresponding to the coherency units which are assigned to SMP node 12A (i.e. for which SMP node 12A is the home node).

It is noted that for the embodiment of FIG. 2, directory 66 and MTAG 68 store information for each coherency unit (i.e., on a coherency unit basis). Conversely, translation storage 64 stores local physical to global address translations defined for pages. A page includes multiple coherency units, and is typically several kilobytes or even megabytes in size.

Computer system 10 accordingly creates local physical address to global address translations on a page basis (thereby allocating a local memory page for storing a copy of a remotely stored global page). Therefore, blocks of memory 22 are allocated to a particular global address on a page basis as well. However, as stated above, coherency states and coherency activities are performed upon a coherency unit. Therefore, when a page is allocated in memory to a particular global address, the data corresponding to the page is not necessarily transferred to the allocated memory. Instead, as processors 16 access various coherency units within the page, those coherency units are transferred from the owner of the coherency unit. In this manner, the data actually accessed by SMP node 12A is transferred into the corresponding memory 22. Data not accessed by SMP node 12A may not be transferred, thereby reducing overall bandwidth usage upon network 14 in comparison to embodiments which transfer the page of data upon allocation of the page in memory 22.

It is noted that in one embodiment, translation storage 64, directory 66, and/or MTAG 68 may be caches which store only a portion of the associated translation, directory, and MTAG information, respectively. The entirety of the translation, directory, and MTAG information may be stored in tables within memory 22 or a dedicated memory storage (not shown). If required information for an access is not found in the corresponding cache, the tables are accessed by system interface 24.

Figure 2A:
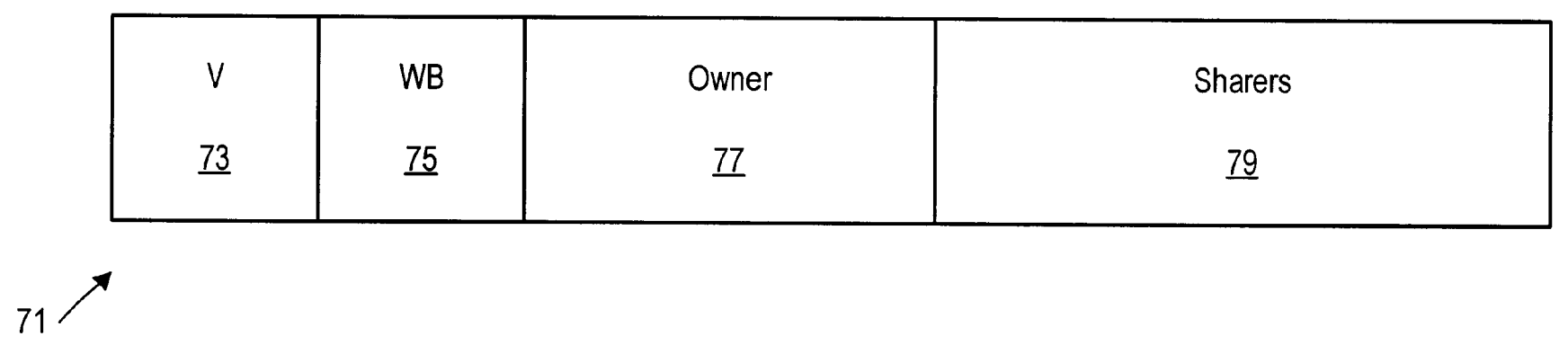

Turning now to FIG. 2A, an exemplary directory entry 71 is shown. Directory entry 71 may be employed by one embodiment of directory 66 shown in FIG. 2. Other embodiments of directory 66 may employ dissimilar directory entries. Directory entry 71 includes a valid bit 73, a write back bit 75, an owner field 77, and a sharers field 79.

Directory entry 71 resides within the table of directory entries, and is located within the table via the global address identifying the corresponding coherency unit. More particularly, the directory entry 71 associated with a coherency unit is stored within the table of directory entries at an offset formed from the global address which identifies the coherency unit.

Valid bit 73 indicates, when set, that directory entry 71 is valid (i.e. that directory entry 71 is storing coherency information for a corresponding coherency unit). When clear, valid bit 73 indicates that directory entry 71 is invalid.

Owner field 77 identifies one of SMP nodes 12 as the owner of the coherency unit. The owning SMP node 12A–12D maintains the coherency unit in either the modified or owned states. Typically, the owning SMP node 12A–12D acquires the coherency unit in the modified state. Subsequently, the owning SMP node 12A–12D may then transition to the owned state upon providing a copy of the coherency unit to another SMP node 12A–12D. The other SMP node 12A–12D acquires the coherency unit in the shared state. In one embodiment, owner field 77 comprises two bits encoded to identify one of four SMP nodes 12A–12D as the owner of the coherency unit.

Sharers field 79 includes one bit assigned to each SMP node 12A–12D. If an SMP node 12A–12D is maintaining a shared copy of the coherency unit, the corresponding bit within sharers field 79 is set. Conversely, if the SMP node 12A–12D is not maintaining a shared copy of the coherency unit, the corresponding bit within sharers field 79 is clear. In this manner, sharers field 79 indicates all of the shared copies of the coherency unit which exist within the computer system 10 of FIG. 1.

Write back bit 75 indicates, when set, that the SMP node 12A–12D identified as the owner of the coherency unit via owner field 77 has written the updated copy of the coherency unit to the home SMP node 12. When clear, bit 75 indicates that the owning SMP node 12A–12D has not written the updated copy of the coherency unit to the home SMP node 12A–12D.

Figure 3:
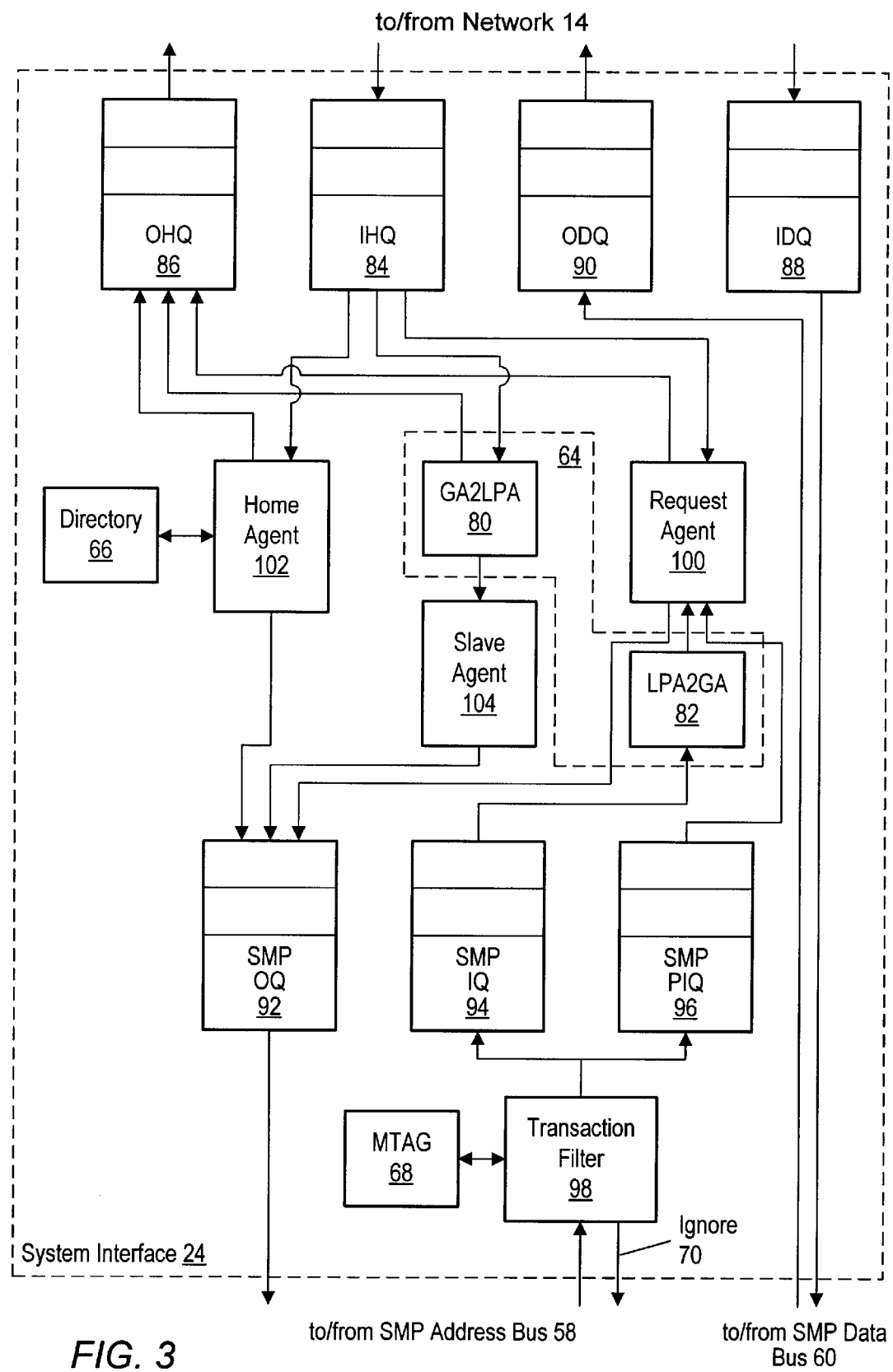
FIG. 3 is a block diagram of one embodiment of a system interface shown in FIG. 1.

Turning now to FIG. 3, a block diagram of illustrating features of one embodiment of system interface 24 which are operational during SSM mode is shown. As shown in FIG. 3, system interface 24 includes directory 66, translation storage 64, and MTAG 68. Translation storage 64 is shown as a global address to local physical address (GA2LPA) translation unit 80 and a local physical address to global address (LPA2GA) translation unit 82.

System interface 24 also includes input and output queues for storing transactions to be performed upon SMP bus 20 or network 14. Specifically, for the embodiment shown, system interface 24 includes input header queue 84 and output header queue 86 for buffering header packets to and from network 14. Header packets identify an operation to be performed, and specify the number and format of any data packets which may follow. Output header queue 86 buffers header packets to be transmitted upon network 14, and input header queue 84 buffers header packets received from network 14 until system interface 24 processes the received header packets. Similarly, data packets are buffered in input data queue 88 and output data queue 90 until the data may be transferred upon SMP data bus 60 and network 14, respectively.

SMP out queue 92, SMP in queue 94, and SMP I/O in queue (PIQ) 96 are used to buffer address transactions to and from address bus 58. SMP out queue 92 buffers transactions to be presented by system interface 24 upon address bus 58. Reissue transactions queued in response to the completion of coherency activity with respect to an ignored transaction are buffered in SMP out queue 92. Additionally, transactions generated in response to coherency activity received from network 14 are buffered in SMP out queue 92. SMP in queue 94 stores coherency related transactions to be serviced by system interface 24. Conversely, SMP PIQ 96 stores I/O transactions to be conveyed to an I/O interface residing in another SMP node 12. I/O transactions generally are considered non-coherent and therefore do not generate coherency activities.

SMP in queue 94 and SMP PIQ 96 receive transactions to be queued from a transaction filter 98. Transaction filter 98 is coupled to MTAG 68 and SMP address bus 58. If transaction filter 98 detects an I/O transaction upon address bus 58 which identifies an I/O interface upon another SMP node 12, transaction filter 98 places the transaction into SMP PIQ 96. If a coherent transaction to an LPA address is detected by transaction filter 98, then the corresponding coherency state from MTAG 68 is examined. In accordance with the coherency state, transaction filter 98 may assert ignore signal 70 and may queue a coherency transaction in SMP in queue 94. Ignore signal 70 is asserted and a coherency transaction queued if MTAG 68 indicates that insufficient access rights to the coherency unit for performing the coherent transaction is maintained by SMP node 12A. Conversely, ignore signal 70 is deasserted and a coherency transaction is not generated if MTAG 68 indicates that a sufficient access right is maintained by SMP node 12A.

Transactions from SMP in queue 94 and SMP PIQ 96 are processed by a request agent 100 within system interface 24. Prior to action by request agent 100, LPA2GA translation unit 82 translates the address of the transaction (if it is an LPA address) from the local physical address presented upon SMP address bus 58 into the corresponding global address. Request agent 100 then generates a header packet specifying a particular coherency request to be transmitted to the home node identified by the global address. The coherency request is placed into output header queue 86. Subsequently, a coherency reply is received into input header queue 84. Request agent 100 processes the coherency replies from input header queue 84, potentially generating reissue transactions for SMP out queue 92 (as described below).

Also included in system interface 24 is a home agent 102 and a slave agent 104. Home agent 102 processes coherency requests received from input header queue 84. From the coherency information stored in directory 66 with respect to a particular global address, home agent 102 determines if a coherency demand is to be transmitted to one or more slave agents in other SMP nodes 12. In one embodiment, home agent 102 blocks the coherency information corresponding to the affected coherency unit. In other words, subsequent requests involving the coherency unit are not performed until the coherency activity corresponding to the coherency request is completed. According to one embodiment, home agent 102 receives a coherency completion from the request agent which initiated the coherency request (via input header queue 84). The coherency completion indicates that the coherency activity has completed. Upon receipt of the coherency completion, home agent 102 removes the block upon the coherency information corresponding to the affected coherency unit. It is noted that, since the coherency information is blocked until completion of the coherency activity, home agent 102 may update the coherency information in accordance with the coherency activity performed immediately when the coherency request is received.

Slave agent 104 receives coherency demands from home agents of other SMP nodes 12 via input header queue 84. In response to a particular coherency demand, slave agent 104 may queue a coherency transaction in SMP out queue 92. In one embodiment, the coherency transaction may cause caches 18 and caches internal to processors 16 to invalidate the affected coherency unit. If the coherency unit is modified in the caches, the modified data is transferred to system interface 24. Alternatively, the coherency transaction may cause caches 18 and caches internal to processors 16 to change the coherency state of the coherency unit to shared. Once slave agent 104 has completed activity in response to a coherency demand, slave agent 104 transmits a coherency reply to the request agent which initiated the coherency request corresponding to the coherency demand. The coherency reply is queued in output header queue 86. Prior to performing activities in response to a coherency demand, the global address received with the coherency demand is translated to a local physical address via GA2LPA translation unit 80.

According to one embodiment, the coherency protocol enforced by request agents 100, home agents 102, and slave agents 104 includes a write invalidate policy. In other words, when a processor 16 within an SMP node 12 updates a coherency unit, any copies of the coherency unit stored within other SMP nodes 12 are invalidated. However, other write policies may be used in other embodiments. For example, a write update policy may be employed. According to a write update policy, when an coherency unit is updated the updated data is transmitted to each of the copies of the coherency unit stored in each of the SMP nodes 12.

Referring back to FIG. 2, in the SSM mode of operation, when processor 16 attempts to read or write to a memory location, the MMU within processor 16 converts the virtual address generated by the program to a physical address. The physical address includes a node ID field which indicates the home node to which the physical address is assigned. If the home node corresponds to the node which initiates the transaction (i.e. the requesting node), the address is referred to as a local physical address. Alternatively, if the node ID field identifies a node other than the requesting node, the address is referred to as a global address. Using the physical address, processor 16 determines whether the data that corresponds to the physical address is stored in cache 18. Cache 18 may store data corresponding to local physical addresses or data corresponding to global addresses (data accessed in a NUMA manner may be stored in cache with a global address).

If the data is found in cache 18, processor 16 accesses the data from the cache. Alternatively, if the data is not located in cache 18, then a request for the data is output on SMP bus 20. If the physical address is a global address, system interface 24 will initiate a global transaction to acquire the desired data. Alternatively, if the physical address is a local physical address, system interface logic 62 will determine whether the node has sufficient access rights to perform the transaction by reading the entry of MTAG 68 that corresponds to address. If the node has sufficient access rights for the desired transaction, the transaction is performed on the data in memory 22. In one embodiment, the data may be transferred to cache 18 before the transaction is performed. If the node does not have sufficient access rights, the node must acquire sufficient access rights before performing the transaction. The node obtains the access rights by initiating a coherency operation to obtain those rights.

In one embodiment, each node includes two logical address spaces. Both logical address spaces are mapped to memory 22. A first address space, called CMR space, stores shadow copies of data from other nodes. The remaining data is stored in a second address space, called local address space.

In one embodiment, a local physical address includes an address bit, called a CMR bit, that indicates whether the local physical address corresponds to an address assigned to the requesting node (i.e., the requesting node is the home node for the data) or to a shadow page within the CMR address space (i.e., a shadow copy of data from a remote node). If the CMR bit is set, which indicates the data is a shadow page, system interface 24 translates the local physical address to a global address prior to performing a coherency operation. Alternatively, if the CMR bit is clear, which indicates the requesting node is the home node for the data, the local physical address is the same as the global address and no translation is necessary prior to performing a coherency operation. Addresses with the CMR bit set are mapped to CMR space. Addresses with the CMR bit cleared are mapped to local address space.

Without the CMR bit, system interface logic 24 cannot differentiate between a local physical address that corresponds to local data and a local physical address that corresponds to a shadow copy of remote data. Accordingly, system interface 24 will translate all local physical addresses prior to performing a coherency operation. Because the translation is unnecessary for local physical addresses that correspond to local data, the translation adds unnecessary latency to the transaction and increases the bandwidth that translation storage 64 must handle. Additional details regarding a system which supports coherent memory replication may be found in a copending, commonly assigned patent application entitled "Selective Address Translation In Coherent Memory Replication" by Erik E. Hagersten, filed concurrently herewith. Furthermore, a protocol for acquiring sufficient access rights is discussed in more detail in copending, commonly assigned patent application (A Multiprocessing Computer System Employing Local and Global Address Spaces And Multiple Access Modes), filed Jul. 1, 1996, Ser. No. 08/675,635. These applications are incorporated herein by reference in their entirety.

Figure 4:
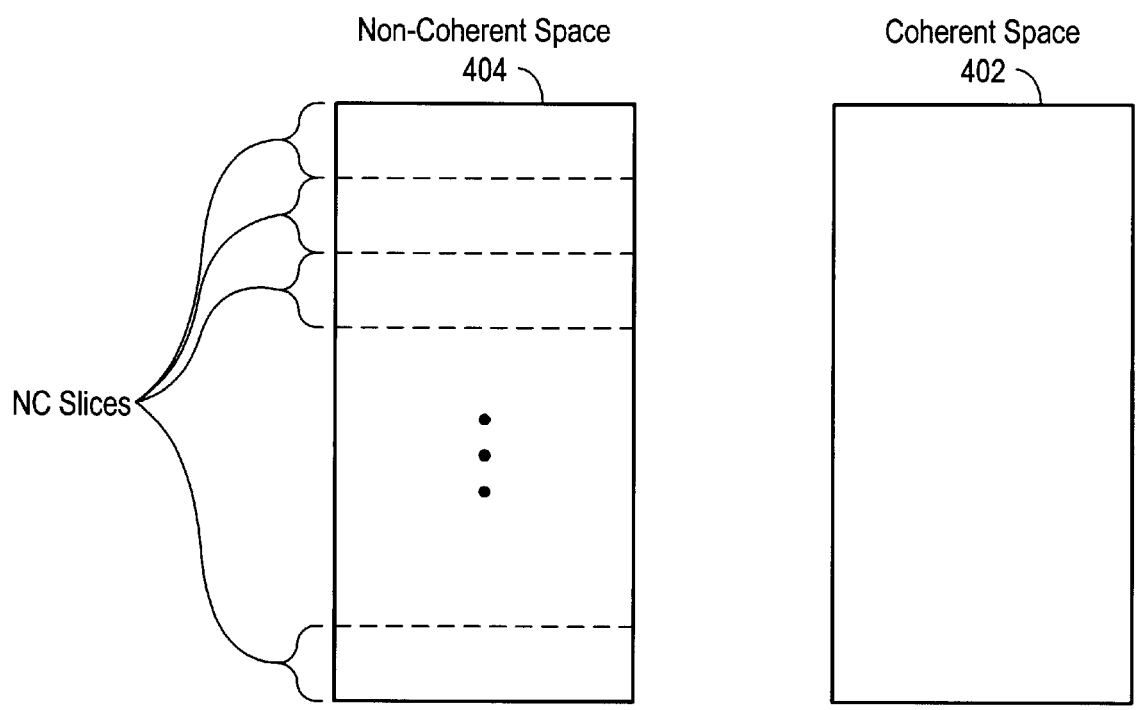
FIG. 4 illustrates an exemplary mapping of physical addresses within an embodiment of a computer system.

FIG. 4 illustrates an exemplary mapping of physical addresses within one specific implementation of computer system 10. By software convention, the MSB (most significant bit) of the physical address is typically driven to "0" for coherent space transactions and is driven to "1" for non-coherent space 404 transactions. Generally speaking, during the SSM mode of computer system 10, coherent transactions (as described previously) are performed for requests to memory locations within the coherent space 402. The coherent space 402 may be divided into several separate regions, wherein an access to any specific region may dictate the type of operation to be performed. For example, a first region of coherent space 402 may be used to specify normal memory read and write accesses to particular locations, while other regions may be dedicated for specifying that specialized operations be performed upon the particular locations (i.e., upon the same physical memory), such as flush operations and fast write stream operations, among others. Non-coherent space 404 is used during the SSM mode for accessing I/O devices and for configuration storage. In one embodiment, the physical address comprises a total of 43 bits. It is understood, however, that any number of address bits may be employed in variations of the system.

Details regarding the operation of computer system 10 in a cluster mode are next discussed. As stated previously, cluster mode may be established upon system initialization by appropriately setting the configuration of the system interface 24 of each node. In other embodiments, a multi-processing computer system may be configured to operate only in cluster mode (i.e., a system which does not support alternative modes such as SSM).

Referring back to FIG. 1, in the cluster mode of operation, each of (or multiples of) the SMP nodes 12 may be operated as separate cluster nodes, wherein accesses to the memory of a particular node 12 by other cluster nodes may be restricted and protected against, as determined by operating system control over the configuration of each of the system interfaces. Each cluster node in such a system typically runs its own kernel.

Figure 5:
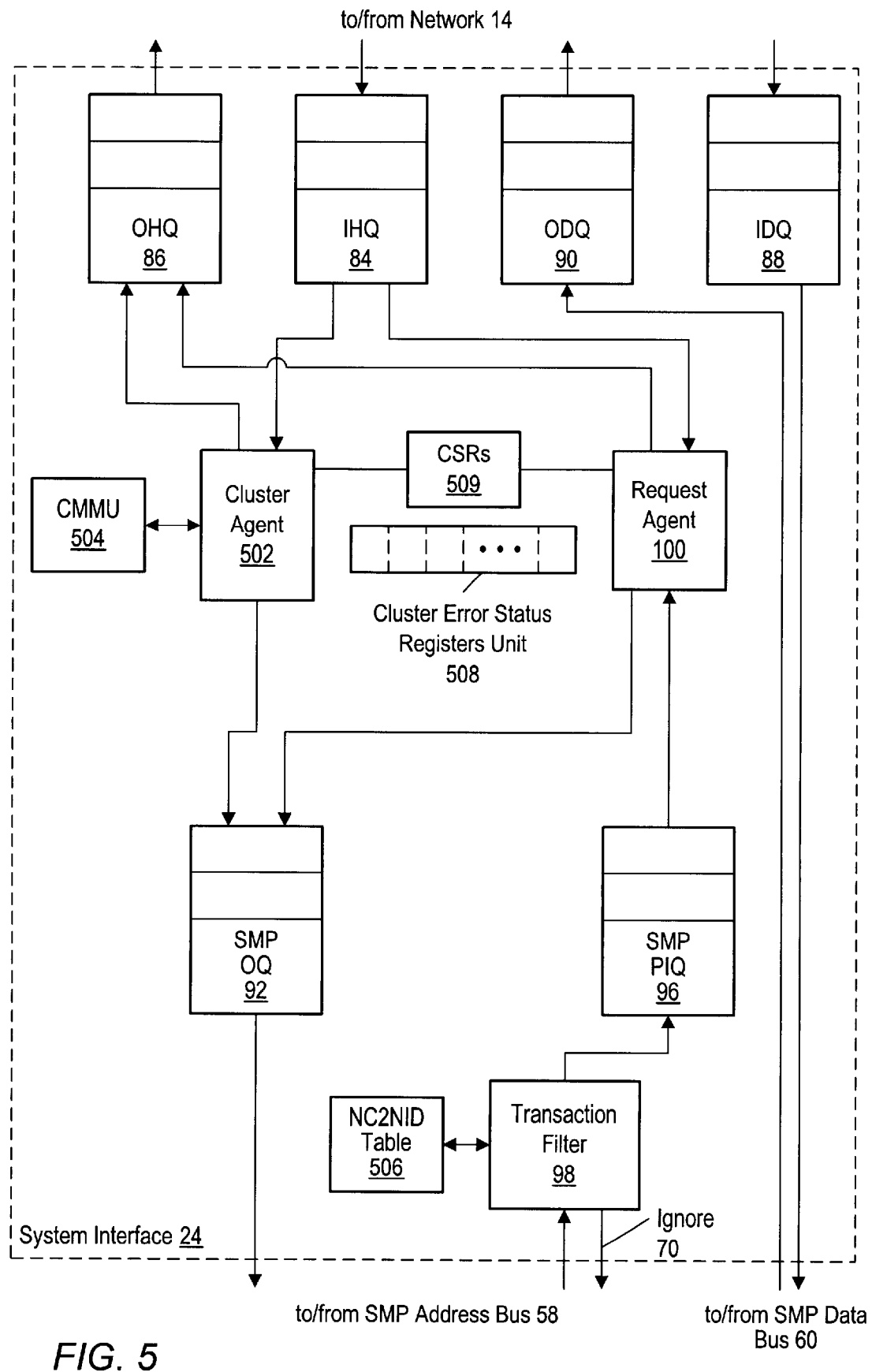
FIG. 5 is a block diagram which depicts features of a system interface which are operational during a cluster mode of operation.

FIG. 5 is a block diagram which depicts features of a system interface 24 which are operational during the cluster mode. Features illustrated within the system interface 24 of FIG. 5 that correspond to those of FIG. 3 are numbered identically for simplicity and clarity. As illustrated in FIG. 5, a cluster agent 502 is coupled between SMP0Q 92, which provides an interface to SMP bus 20, and input and output header queues 84 and 86, which provide an interface to network 14. A cluster memory management unit (CMMU 504) is shown coupled to cluster agent 502. Finally, an NC2NID table 506 is shown coupled to transaction filter 98, and a cluster error status registers unit 508 is shown coupled to request agent 100. Various aspects regarding the operation of system interface 24 during the cluster mode of operation will next be considered.

Referring collectively to FIGS. 1 and 5, a remote cluster node may be accessed by launching either a read or a write type transaction to a dedicated address in the initiating node. For example, in a configuration wherein each SMP node 12 forms a different cluster node, cluster node 12A may access a location in cluster node 12B by launching either a read or a write type request transaction through network 14. The launching mechanism of node 12A will identify node 12B as the receiver of the read or write transaction. In one specific implementation, only read and write transaction requests, which may be conveyed in the form of packets, are transferred on the global network 14 between the system interfaces 24 of differing cluster nodes. It is contemplated, however, that in other systems, other specific types of transaction requests conveyed between cluster nodes may be supported.

In cluster mode, only the non-coherent address space 404 is utilized for addressing memory locations. In one specific implementation, the entire non-coherent space is divided into 256 "cluster slices" (CS), each one being 16 GB large. A particular slice may thus be identified using 8 bits of the address conveyed upon SMP bus 20 during the address phase of a particular transaction. The NC2NID table 506 of each system interface 24 is initialized to associate these slices with remote nodes or to be "not valid", in which case the system interface 24 ignores the transaction on its SMP bus 20. Thus, when a transaction is initiated by a particular processor 16 on SMP bus 20, the NC2NID table 506 of the system interface 24 of that node is accessed to determine if the transaction is directed to a remote cluster node as determined by the slice mappings. If a transaction is directed to a remote cluster node, the node ID for that remote cluster node is retrieved from the NC2NID table 506. The node ID along with the request initiated upon SMP bus 20 is then provided to request agent 100 through queue 96. Request agent 100 responsively causes a packet indicating the requested transaction to be routed through network 14 for communication to the remote node. It is noted that the node ID supplied by the NC2NID table 506 is utilized by routing logic (not shown) associated with system interface 24 which causes the transaction to be communicated over the appropriate channel of network 14 which provides connection to the identified remote node. The NC2NID table 506 may further be used to control the routing of data packets received from SMP bus 20 to a particular remote node.

As used herein, the terms "transaction" and "packet" are used to generally refer to information conveyed through a bus. The specific form of a "transaction" or a "packet" is dependent upon the specific bus protocol. Furthermore, the specific information contained within a transaction or packet conveyed through a bus may be dependent, for example, upon whether a particular transaction is being used to indicate the iniation of a particular operation, such as a read or write operation to a particular address, or to supply information such as data or an acknowledgement in response to a previous transaction.

Upon arrival of a transaction which indicates a requested operation at the remote node, the transaction undergoes a protection/translation step within the CMMU 504 of the remote node. The CMMU 504 of each node is initialized by the kernel for that node before an access is allowed to a specific slice of the cluster address space.

As will be described in further detail below, CMMU 504 includes a per-page translation entry with information regarding which other cluster nodes may access this page, which types of accesses (read and/or write) are allowed, the local physical page address for the node, and what command type should be launched in the node in response to the cluster communication (received through network 14). In one specific implementation, several different command types may be specified, including memory operations (i.e. read/write), atomic test and set operations, I/O operations, and interrupt operations, among others. Further details regarding these command types and other aspects of the operation of CMMU 504 will be discussed further below.

In a further embodiment, a remote cluster node may be reached by going through one or more intermediate nodes (or "switches") configured in pass-through mode. The number of such intermediate hops is transparent in the transferring of read and write data. However, to support this functionality, various mechanisms are provided, as discussed further below.

Figure 6:
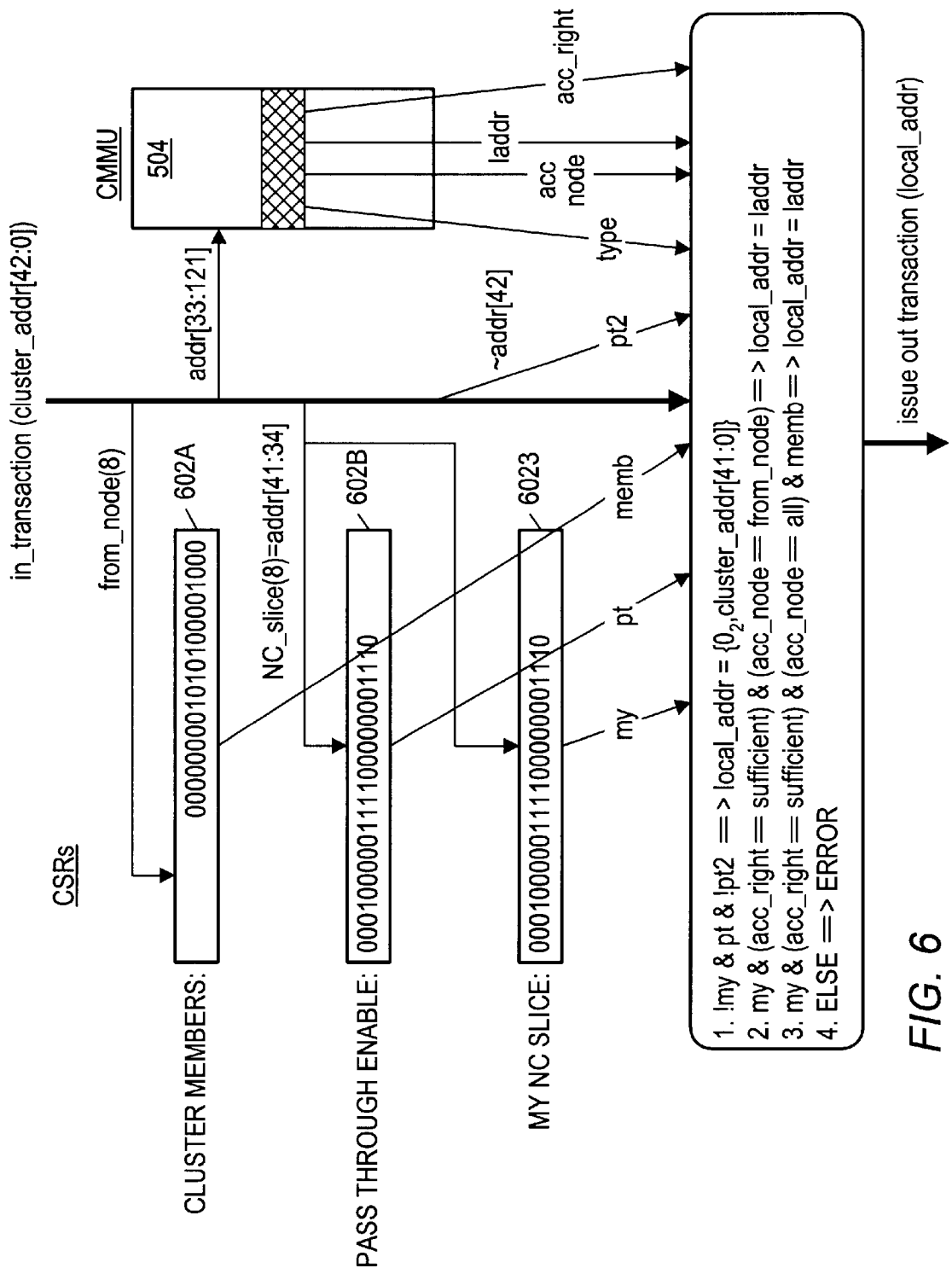
FIG. 6 illustrates functionality performed by a cluster memory management unit.
Figure 7:
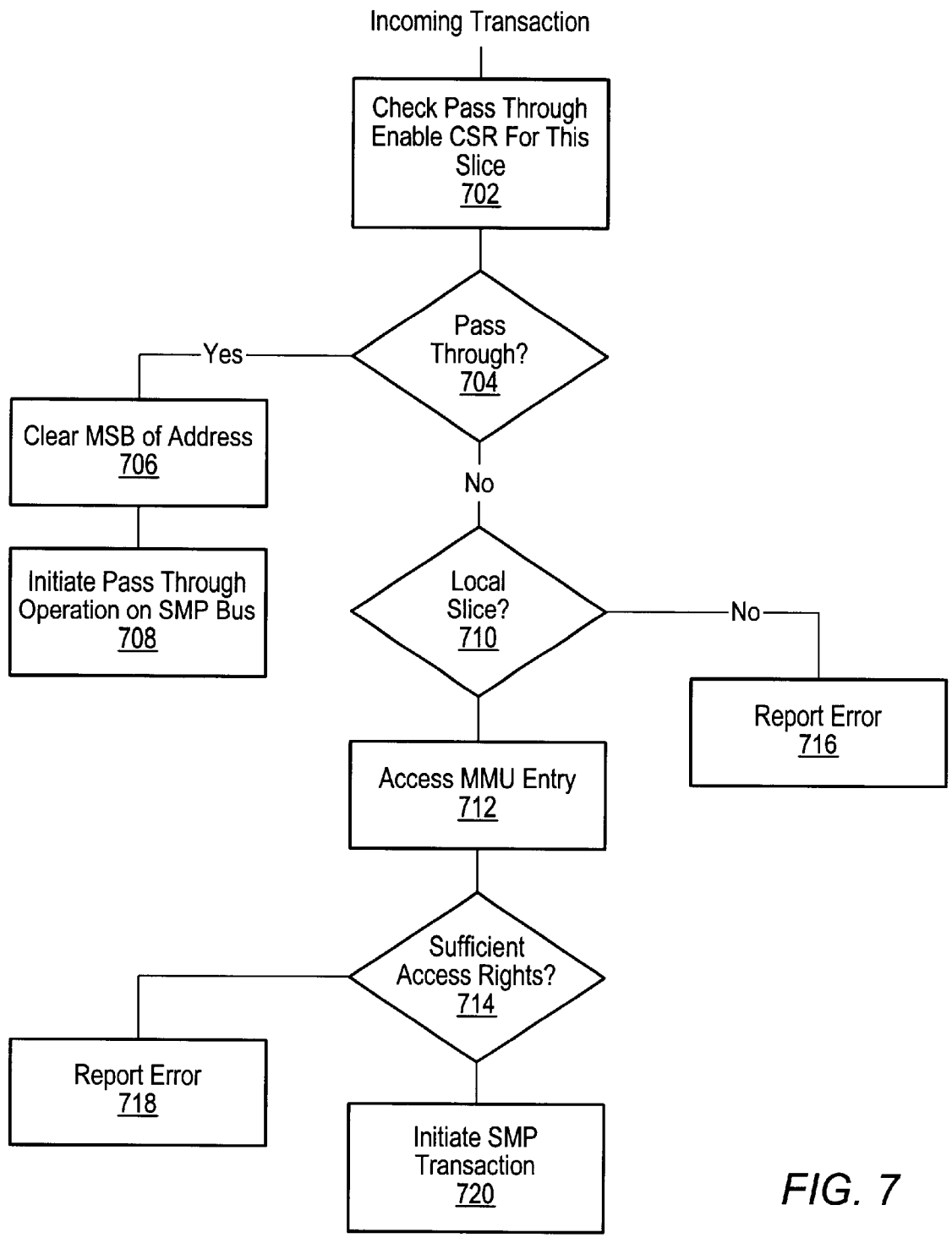
FIG. 7 illustrates particular cluster protection checks which may be performed by an embodiment of the computer system.

Further details regarding the receipt of cluster communications from a remote cluster node by system interface 24 are considered with reference to FIGS. 6 and 7. FIG. 6 illustrates functionality performed by CMMU 504, as well as functionality associated with a set of cluster status registers (CSRs) 602A–602C which are coupled to cluster agent 502. FIG. 7 illustrates particular cluster protection checks which may be performed by cluster agent 502 in response to the cluster node receiving a transaction from network 14 through input header queue 84.

As illustrated, in one particular implementation, an incoming transaction which indicates a requested operation (i.e., either read or write) includes a cluster address of 43 bits. The cluster address includes a field which specifies the NC slice corresponding to this transaction, a page address (LPA page) specifying the page corresponding to the access, and a field for specifying the page offset. The incoming transaction packet further includes a "from node" field which indicates the node that initiated the request.

CSR 602A (also referred to as the cluster member CSR) is programmed to specify the cluster members from which transactions may be received and processed (that is, CSR 602A may be programmed to indicate the other nodes with which it is "friendly"). CSR 602B (also referred to as the pass through enable CSR) is programmed to indicate whether this node is acting as a hop for a particular slice. Finally, CSR 602C (also referred to as the local NC slice CSR) is programmed to identify the slices which are local to a particular node. Typically, a particular cluster node would not have both the pass through enable bit for a particular slice set at the same time the local NC slice bit for that slice is set.

As illustrated in FIG. 7, during operation when a transaction or packet is received by cluster agent 502, the first protection check tests to determine if this is a pass through transaction to an NC slice which has pass-through enabled (by checking the corresponding bit of pass-through enable CSR 602B) during steps 702 and 704. The checking mechanism may further insure that this transaction has not previously done a pass through hop in another cluster node by checking the highest order bit of the cluster address, as will be discussed in further detail below. If the packet is a pass-through packet, the MSB of the address is cleared to a "0", and a corresponding packet is conveyed upon SMP bus 20 (steps 706 and 708).

If the incoming transaction is not a pass-through packet, the protection mechanism of cluster agent 502 then checks if the incoming transaction is for an NC slice local to this cluster node (by checking a corresponding bit of the NC slice CSR 602C) during step 710. Cluster agent 502 additionally indexes into the corresponding page entry of CMMU 504 (step 712) using selected bits of the cluster address (e.g., the page address). Each entry of CMMU 504 includes an "access right" field which indicates whether cluster read requests, cluster write requests, or both, received from network 14 are allowed access rights for that page, a LADDR field which specifies the local physical address for the page to be accessed within the node, an "access node" field which specifies what initiating cluster nodes are explicitly allowed access to this node, and a "type" field which may be used to specify the specific operation to be invoked on SMP bus 20. Thus, using the page entry of CMMU 504 when a transaction is received, upon step 714 cluster agent 502 determines if the access right is sufficient (e.g. accesses for that particular page may be allowed if the transaction is a read, while disallowed if the transaction is a write, etc.) and determines whether the initiating cluster node is explicitly allowed access to this cluster mode. The transaction issued on SMP bus 20 uses the local physical page address obtained from a field of the CMMU 504 for the page address of the corresponding transaction to be initiated on SMP bus 20.

A third protection check implemented (also step 714) by cluster agent 502 tests to determine if the incoming transaction is for an NC slice covered by this node (as specified by corresponding bit of NC slice CSR 602C during step 710), whether the access right to the slice is sufficient, whether the initiating cluster node is a cluster member (as specified by corresponding bit of cluster members CSR 602A), and whether the CMMU entry for that page specifies accesses for "all" cluster member nodes. A transaction which meets this test also gets its local physical page address from the CMMU local physical address entry.

At most, only one of the three protection checks implemented by cluster agent 502 will have a positive outcome. All other cases are reported as an error condition (steps 716 and 718). The treatment of error conditions will be discussed in further detail below.

If one of the protection checks for an incoming transaction passes, a transaction is issued on the receiving node's SMP bus 20 (step 708 or 720). In the case of a pass-through transaction, a corresponding transaction is issued on SMP bus 20 of the pass through node using the original GA address received in the cluster transaction (and without accessing the pass through node's CMMU). However, the MSB of the address is driven to a "0" to indicate that this is a pass-through transaction.

Thus, upon initialization of a particular cluster node, the kernel for that node may program the entries of CMMU 504 as well as the node's control status registers 602A–602C. The cluster node can thus effectively protect against unauthorized accesses by remote nodes. Flexible and efficient operation is further accomodated due to the several protection checks implemented by cluster agent 502 and controlled by CMMU 504 and CSRs 602A–602C.

Additionally, since each CMMU entry includes a type field which controls the specific type of operation performed on SMP node 20, even further flexibility and control over cluster communications may be dictated by each receiving cluster node. In one specific implementation, there are four different types of operations which may be specified:

a) Memory operations (i.e., read/write).

b) Atomic test and set (i.e., a read operation to memory returns the old value from memory and atomically sets a bit). This can be generalized to similar types of operations, such as fetch-and-phi, i.e., fetch-and-increment/fetch-and-decrement, etc.

c) IO operations, which required a different command to be issued in the node.

d) Interrupt operation. This is a write type operation. Here, the CMMU stores information about which CPU to send the interrupt to and part of the interrupt data to be sent to the CPU.

In other embodiments, other specific operations within a local node may be specified by the type field of the CMMU entry in response to cluster communications.

Figure 8:
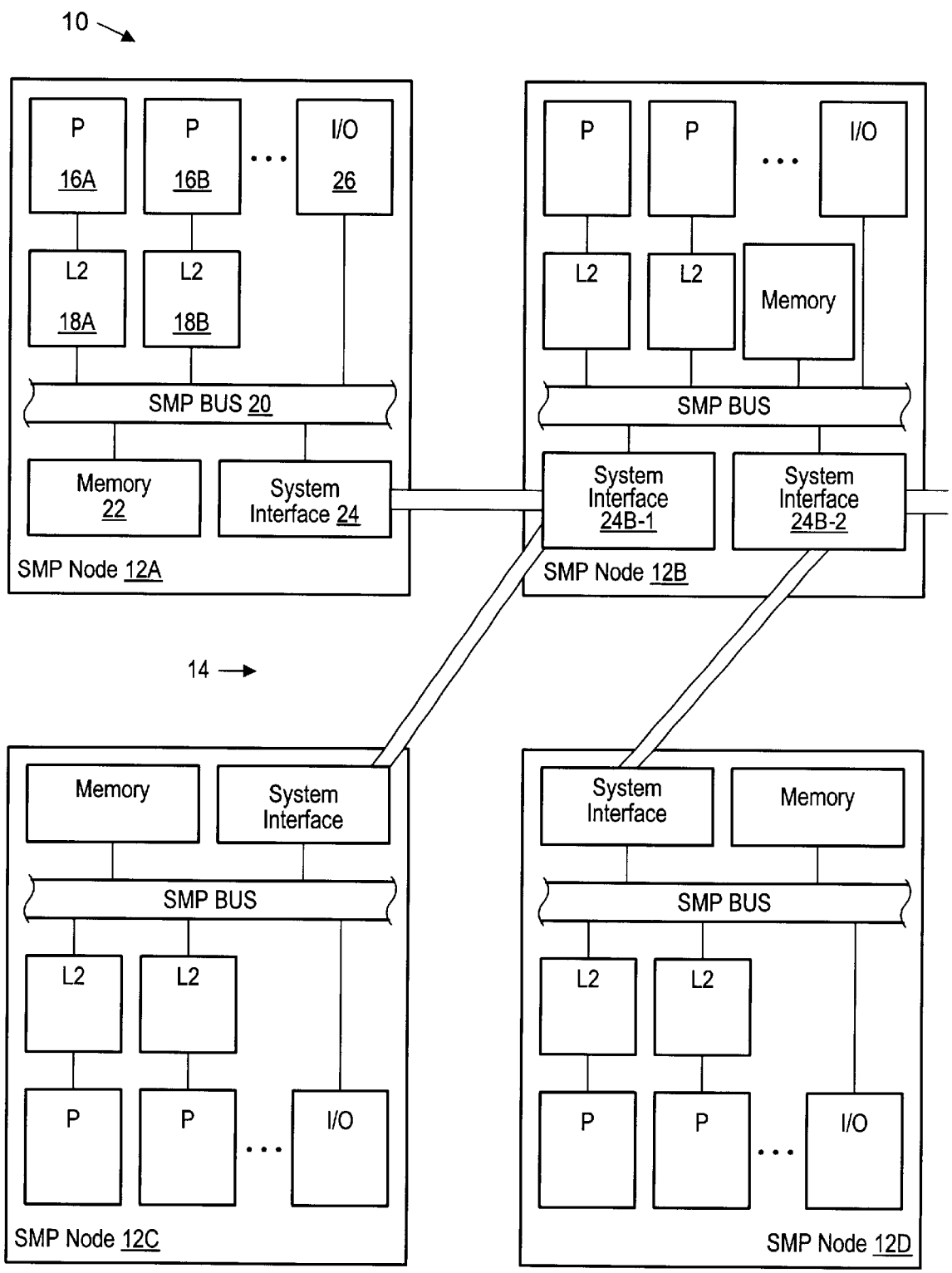
FIG. 8 is a diagram which illustrates a configuration for a global interconnect network in a computer system.

As stated previously, in one embodiment a remote cluster node may be reached by passing a transaction through one or many intermediate nodes configured in pass-through mode. FIG. 8 is a diagram which illustrates a configuration for network 14 in which node 12B is used as a hop for communications between both nodes 12A and 12C as well as between nodes 12A and 12D. As illustrated, pass through operations in a particular cluster node may be handled through only a single system interface, such as system interface 24B-1, or handled by differing system interfaces within a common cluster node, such as system interfaces 24B-1 and 24B-2. Details regarding pass through operations for each of these cases will next be discussed.

Consider a situation wherein, for example, a read or a write transaction is launched by system interface 24 of node 12A which is directed to a slice mapped to node 12D. As stated previously, such a transaction may be initiated by a processor 16 of node 12A. When the transaction is initiated on SMP bus 20 of node 12A, the system interface 24 of node 12A uses its NC2NID table to determine that the transaction is destined for node 12D. System interface 24 accordingly conveys a request packet upon network 14 to communicate the request. In this instance, the routing logic associated with system interface 24 will route the request through the channel connected to node 12B. Included with the request packet conveyed through network 14 is the node ID for node 12A (the initiator node ID). When system interface 24B-1 of node 12B receives the request packet, its cluster agent 502 initiates the protection checks as described above. In this instance, node 12B will be set up as a pass through hop for this slice, and thus no CMMU access is performed within node 12B. Instead, cluster agent 502 causes the most significant bit of the cluster address to be cleared, and initiates a corresponding transaction upon SMP bus 20 of node 12B. Since the node ID for the initiating node (node 12A) is needed by the receiving node (12D) (for its protection mechanisms), a field of the packet conveyed on SMP bus 20 which is normally unused during 10 transactions is used to convey the initiating node ID along with the transaction request.

When the pass through communication is conveyed upon SMP bus 20B of node 12B, system interface 24B-2 would respond to the transaction in accordance with its NC2NID table 506 (that is, the slice address for this transaction will correspond to a valid entry within its NC2NID table and which associates the NC slice with node 12D). In addition, system interface 24B–2 identifies this transaction as being of a pass through type, since the MSB of the conveyed address is "0". In response to detecting this pass through operation, the request agent 100 of system interface 24B-2 will convey a corresponding request packet to node 12D, but will specify node 12A as the initiating node within the packet. The system interface 24D of node 12D receives the request packet from node 12B. For this node, however, the cluster agent 502 will identify the slice as being local to this node, and will perform the protection checks as described previously by accessing its CMMU 504 entry. Assuming the transaction passes the protection checks, the transaction will be conveyed upon the SMP bus 20D of node 12D in accordance with the request packet and the command type specified by the CMMU entry.

Cluster communications from node 12A to 12C in the system of FIG. 8 are handled similarly. In this situation, however, when system interface 24B-1 of the pass through node 12B conveys a transaction upon SMP bus 20B indicating the request initiated by node 12A, the NC2NID table 506 of system interface 24B-1 will identify that slice as being designated for routing through its interface. Accordingly, system interface 24B-1 responds to the transaction initiated upon SMP bus 20B by passing a corresponding packet indicating the request to node 12C through the corresponding channel of network 14.

While the SMP bus 20 of each node may support various specific protocols, in one particular implementation SMP bus 20 is a split transaction bus. In one specific protocol, for a read operation, a transaction is conveyed upon the SMP bus 20 by the initiator which specifies a buffer it has reserved internally for the read data. When the target device obtains the requested data, the target device conveys the data packet to the specified buffer. These transactions may be accomplished through separate address and data phases which include transaction IDs to associate the information (e.g., in the form of packets) received during the different phases. For a write operation, an initiating device may first convey a packet upon SMP bus 20 indicating the address to which it would like to write data. The target device responsively sends a packet in another phase identifying a buffer within the target into which the data should be written. Subsequently, the initiating device writes the data to the specified buffer. In one such specific implementation, the 8 bit cluster node ID information during pass-through operations is conveyed using 6 unused bits of the transaction's byte mask and the two least significant bits of the transaction's address, which are normally unused in this type of I/O transaction since the transaction is required to be 64 byte aligned and comprises 64 bytes. I/O read requests propagated through the switch are normally replied to with a data packet and an associated coding of a tag field to indicate a normal read. Occurrences of various errors upon a read transaction may be conveyed through SMP bus 20 by providing different codings in this tag field to identify the error. Write requests initiated on SMP bus 20 in pass through mode are normally replied to with a pull request identifying a location in the outgoing data buffer of system interface 24. A write error may be propagated through the pass-through node by sending a pull request which specifies an invalid distinction, such as to the device itself. In such a situation, an error code may be encoded using selected bits of the address specified by the pull request. Further details regarding the handling of errors in the cluster will be provided below.

Figure 9:
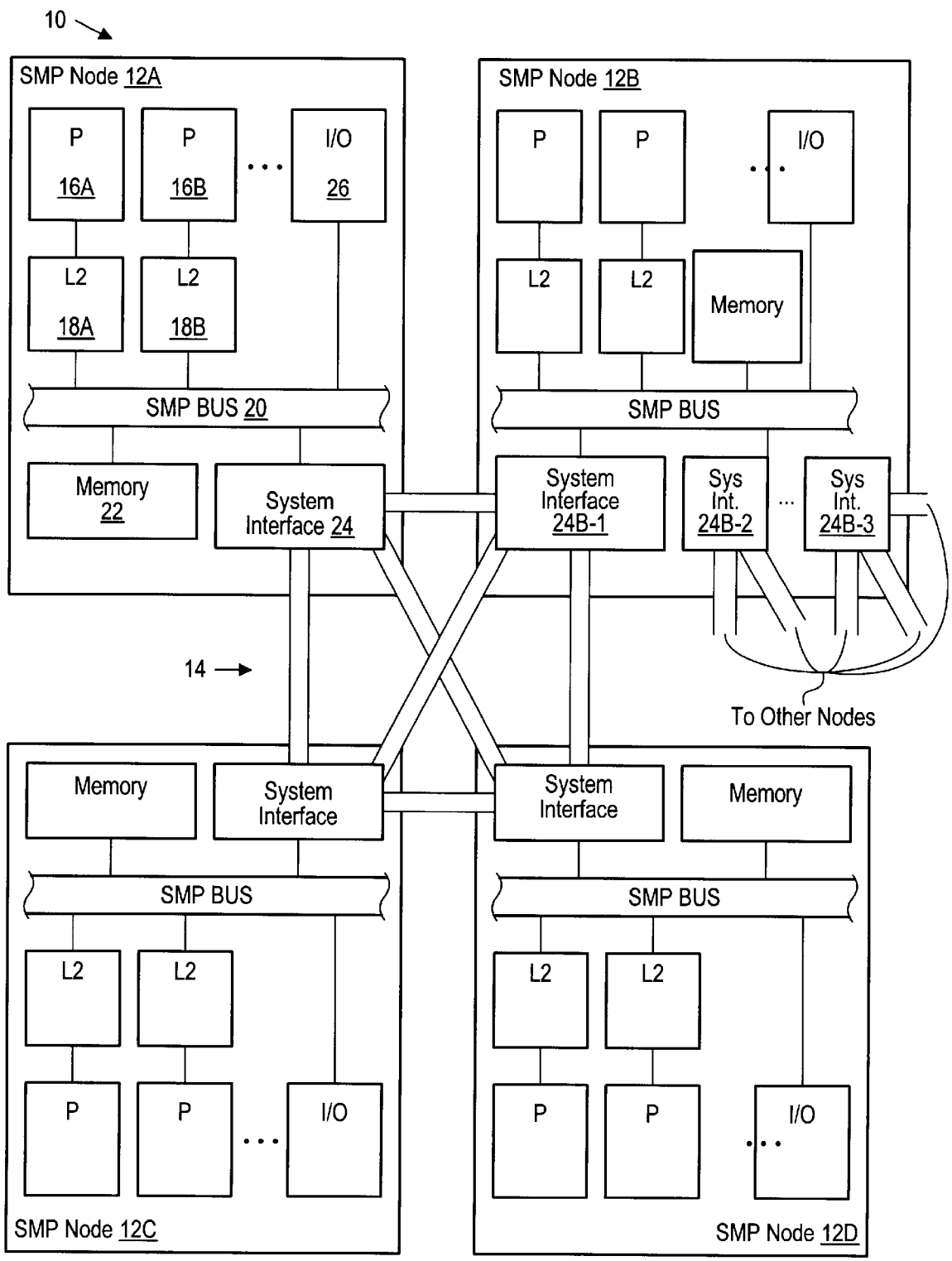
FIG. 9 illustrates an exemplary system configuration wherein a pass-through node includes a plurality of system interfaces.

Several system interfaces may reside within a single node 12. A specific cluster slice may only have a valid NC2NID entry in one interface. In that way, having more than one interface per node increases the connectivity for the node. For example, FIG. 9 illustrates an exemplary system in which node 12B includes a plurality of system interfaces 24B–1 through 24B–I. Each system interface 24, which may be implemented as an integrated circuit chip, includes a finite number of ports to support point-to-point connections to other nodes. Accordingly, by including several system interfaces within a common node, greater connectivity to additional nodes may be achieved. The NC2NID tables in each system interface are configured to control the routing of transactions through the various nodes.

A specific cluster slice may also have a valid NC2NID entry in more than one interface. In that case, the different interfaces may be initialized to handle only a subset of the accesses to that slice. For example, one interface may handle even addresses while another interface handles odd addresses. In that way, having more than one interface may increase the bandwidth provided to one specific node.

Figure 10:
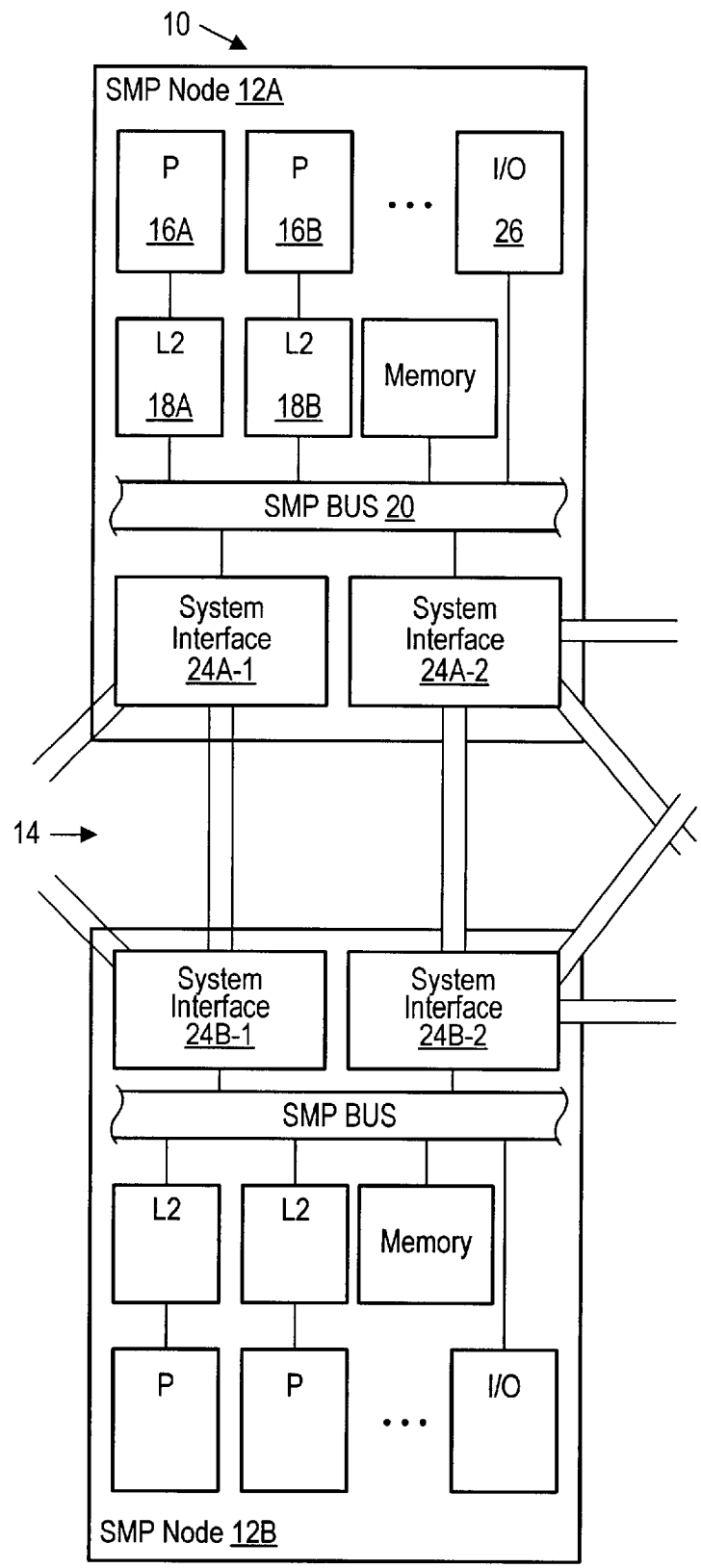
FIG. 10 illustrates an exemplary system configuration for implementing data striping.

This concept may be better understood with reference to FIG. 10. FIG. 10 illustrates an exemplary system configuration wherein a node 12A includes a pair of system interfaces 24A-1 and 24A-2, each coupled to provide selected cluster communications to corresponding system interfaces 24B-1 and 24B-2 of node 12B. In this configuration, a specific cluster slice may have a valid NC2NID entry in both system interface 24A–1 and system interface 24A-2. In this configuration, system interfaces 24A-1 and 24A-2 may be initialized (e.g., using dedicated configuration registers) to handle only a subset of the accesses to that slice. For example, system interface 24A-1 may be configured to handle even addresses for the slice, while system interface 24A-2 is configured to handle odd addresses. This "data striping" thus provides increased bandwidth to node 12B for accesses to that slice, since the burden associated with such transfers is spread between the system interfaces.

The validity of certain slices in a particular interface's NC2NID table may change during system execution. This property can be used to cope with network failures or as an alternative method of balancing load over multiple interfaces.

Figure 11:
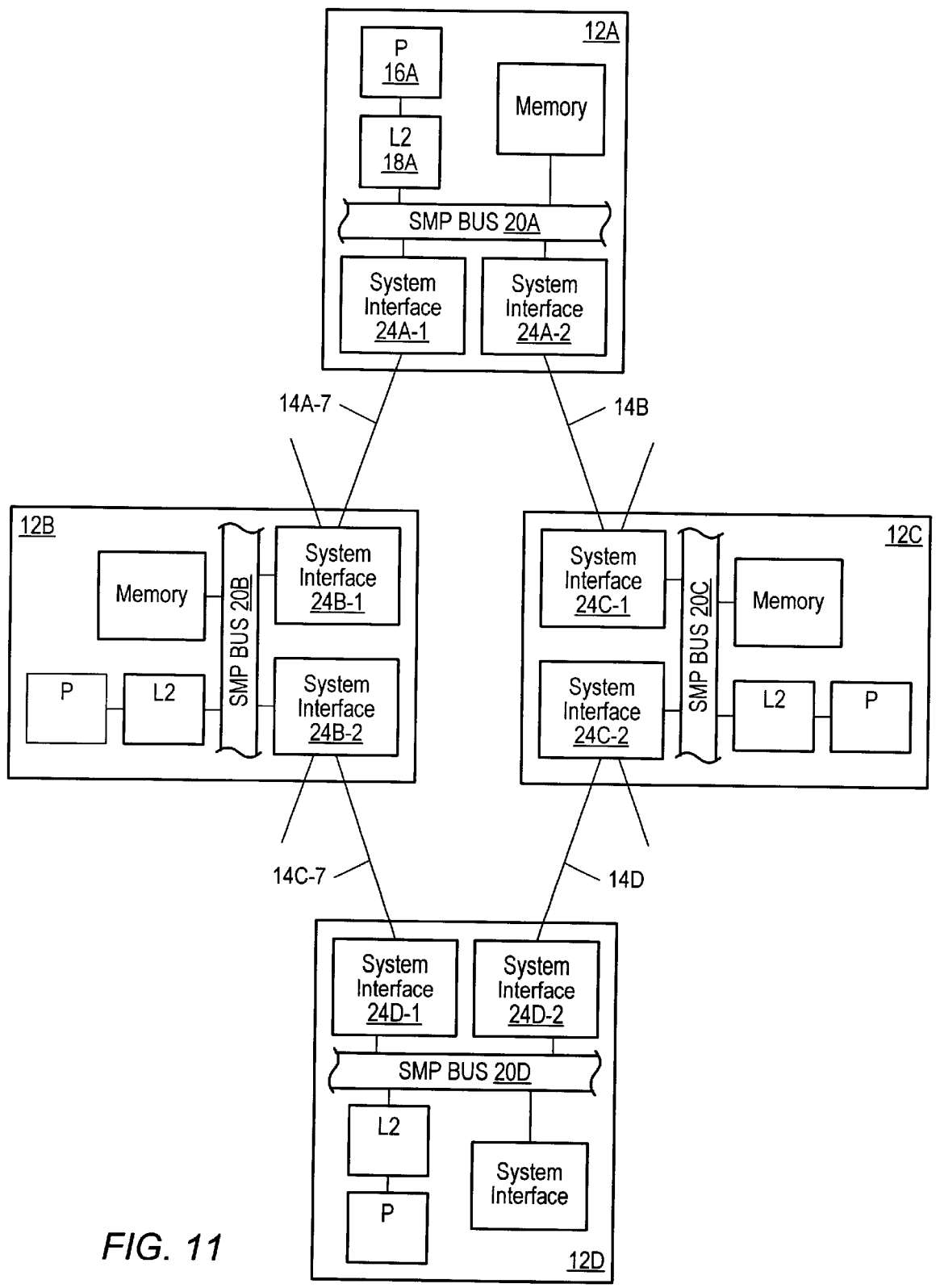
FIG. 11 is a block diagram illustrating a further embodiment of a multiprocessing computer system.

This concept is illustrated by FIG. 11. FIG. 11 illustrates an exemplary system configuration wherein node 12A includes a pair of system interfaces 24A-1 and 24A-2. These interfaces are used in conjunction with a pair of nodes, 12B and 12C, which are operating in a pass through mode and providing switching services between node 12A and a set of other nodes. One particular node in that set is node 12D, which includes a pair of system interfaces 24D-1 and 24D-2. In this configuration, node 12A and 12D might be initialized such that:

system interface 24A-1 contains a valid NC2NID table entry for node 12D;

system interface 24A-2 contains an invalid NC2NID entry for node 12D;

system interface 24D-2 contains a valid NC2NID table entry for node 12A; and system interface 24D-2 contains an invalid NC2NID entry for node 12A.

Thus, all packets from node 12A to node 12D will flow over network 14A, be passthrough routed by node 12B, flow over network 14C, and finally arrive at node 12D; an inverse path would be taken by packets flowing in the reverse direction.

Now, consider what happens if either network 14A, switch node 12B, or network 14C develops a hardware fault: communication between nodes 12A and 12D would be interrupted, and transactions issued by processor 16A targeted at node 12D would fail. This problem can be alleviated by reprogramming the system interfaces contained within nodes 12A and 12C such that:

system interface 24A-1 contains an invalid NC2NID entry for node 12D;

system interface 24A-2 contains a valid NC2NID table entry for node 12D;

system interface 24D-1 contains an invalid NC2NID entry for node 12A; and system interface 24D-2 contains a valid NC2NID entry for node 12A.

Now, all packets from node 12A to node 12D will flow over network 14B, be passthrough routed by node 12C, flow over network 14D, and finally arrive at node 12D; an inverse path would be taken by packets flowing in the reverse direction. An important result of this reprogramming is that processor 16A may now again successfully issue transactions targeted at node 12D, without changing the SMP bus addresses used for that purpose. This substantially simplifies the implementation of software which is designed to support usage of these system interfaces.

Changes to the validity of certain slices in the NC2NID tables of multiple interfaces can also allow load balancing between switch nodes. Consider the situation described in the preceding paragraphs, but assume that instead of a failure of network 14A, node 12B, or network 14C, the reprogramming is motivated by the fact that SMP bus 20B is substantially more loaded than SMP bus 20C. In this case, the reprogramming is not coping with a network failure, but is aiding in balancing the load between the two SMP buses. The difference between the two cases is that in the case of network failure, the system interface 24A-1 may be reprogrammed so that all NC2NID entries were invalid; in other words, node 12B would no long be used for switching purposes. In the load-balancing case, however, only a subset of the NC2NID values in system interface 24A-1 would be reprogrammed to be invalid; that is, the switching of traffic for some, but not all, remote nodes from node 12B to node 12C would be moved.

A manner in which errors are handled within the cluster systems described above is next considered. Referring back to FIG. 5, the cluster error status registers unit 508 of system interface 24 includes a cluster error status register corresponding to each processor within the node. Each cluster error status register may be separately written or read to thereby set or read a specific error code. In one embodiment, each CESR contains 4 bits. If a cluster transaction initiated from the node through network 14 results in an error being communicated back from the remote node, the CESR corresponding to the CPU which initiated the transaction is set to indicate the error. The 4-bit encodings for errors which may be reported and stored by each CESR are as follows:

0. No errors recorded.
1. The interrupt destination is busy.
2. The CMMU access violation (including out-of-bounds).
3. Destination cluster agent error.
4. User-error 0, CMMU entry's user error bit 0 was set.
5. Pause reply (the node is unable to answer right now).
6. Pass-through request-agent timeout.
7. More than one pass-through hop.
8. Pass-through cluster-agent timeout.
9. Invalid SMP transaction to cluster space (e.g., not a block PIO).
10. Request agent read time-out.
11. Request agent received data error (could possibly have been caused beyond a pass-through node).
12. Any other communication error.

As stated previously, an error may be reported to a requesting node if the CMMU in the remote node determines that the initiating node does not have sufficient access rights to the page. There are several additional error types that also may be detected, such as a time out in the remote node while accessing its local memory, user-level defined error in the remote node, and interrupt destination busy. The system interface 24 of the initiating node may also report an error by itself, such as a time out while waiting for a reply from the remote node. Any error detected will be recorded in the CESR corresponding to the CPU that initiated the transaction. Errors are communicated upon network 14 by the system interfaces 24 using error-type transaction packets. To prevent other abnormal activity due to the error, however, the request agent 100 of the system interface 24 to which an error is reported ensures that the initiating CPU will see no direct effect by the error. This is achieved by returning "dummy" read data for a read, and by pulling write data for a write but discarding it. In this manner, an incorrect error reported by a remote node cannot crash the local node.

As stated previously, when a node operates in a pass through mode, an error conveyed by the remote node must be conveyed through the pass through node to the initiating node. In one specific implementation, this error code may be passed through the SMP bus 20 of the pass through node during a read operation by specifying the error within a certain field or set of bits that are normally unused on the SMP bus 20 during I/O transactions. Similarly, for a write type operation, a pull request may be initiated to an invalid location, in which the receiving system interface will detect as indicating an error. The error code may be passed through any normally unused bits of the transaction. In other embodiments, the error messages may be passed through the pass-through node depending upon the particular protocols supported by SMP bus 20.

By looking at a field of an issued transaction on SMP bus 20 which indicates the initiator id (i.e., the CPU that initiated the transaction), request agent 100 can determine which CPU issued the transaction. To record an error associated with that transaction, request agent 100 selects the particular CESR associated with that CPU by using the initiator id to index into the cluster error status registers unit 508.

A processor can periodically read the cluster error status registers unit 508 to determine if any error has been recorded since the last time it read the cluster error status registers unit 508. This may be accomplished by performing a read operation to a particular address in the configuration space of the system to which the cluster error status registers unit 508 is mapped. The initiator id corresponding to that read operation is further used by request agent 100 to determine the specific CESR which should be read. In this manner, a process need not know which CPU it is running on in order to determine which CESR to access.

When the operating system performs a process switch, it may issue a MEMBAR operation, which determines that all outstanding transaction have completed. This also guarantees all errors for those transaction have also been recorded in the CPU's CESR. The process switch code will save the current value of the CPU's CESR and store it together with the other state associated with the process.

When the process eventually is scheduled to start running again, possibly on some other CPU, the process' saved CESR value is restored on that CPU's CESR. This way, the CESR is virtualized to a per-process or a per-task CESR. This allows for it to be used in user-level code.

It is noted that in one embodiment, accessing an address on page "0" of an NC2NID slice is interpreted as accessing the CESR configuration space in the interface handling this subset of this cluster slice. In addition, it is noted that entries in the NC2NID table 506 may also be typed and used for accesses other than cluster accesses, such as accesses to SRAM slices and remote I/O slices.

In yet a further embodiment, it is noted that the number of pass through hops transactions can pass through may be limited. For example, in one embodiment, upon passing a transaction through a first node, the MSB of the cluster address remains "0", such that a subsequent node must either accept the transaction as a local slice, in accordance with its protection mechanism, or report an error. In this manner, transactions are limited to being passed through only a single node, and transactions are prevented from endlessly looping through pass through nodes in the event the system configuration is set in properly. This feature may be enabled or disabled through self-direct control of a configuration register such as a CSR, within each system interface.

Although SMP nodes 12 have been described in the above exemplary embodiments, generally speaking an embodiment of computer system 10 may include one or more processing nodes. As used herein, a processing node includes at least one processor and a corresponding memory. Additionally, circuitry for communicating with other processing nodes is included. When more than one processing node is included in an embodiment of computer system 10, the corresponding memories within the processing nodes form a distributed shared memory. A processing node may be referred to as remote or local. A processing node is a remote processing node with respect to a particular processor if the processing node does not include the particular processor. Conversely, the processing node which includes the particular processor is that particular processor's local processing node.

Numerous variations and modifications will become apparent to those skilled in the art once the above disclosure is fully appreciated. It is intended that the following claims be interpreted to embrace all such variations and modifications.

What is claimed is:

1. A multiprocessing computer system comprising:
   a first node including a processor coupled to a memory through a first local bus, wherein said first node further includes a first system interface coupled to said first local bus and configured to receive transactions initiated by said processor upon said first local bus which are destined to remote nodes;
   a second node including a second system interface coupled to said first system interface through a global interconnect network, wherein said second node includes a second local bus; and
   a third node including a third system interface coupled to said second system interface through said global interconnect network, and wherein said third node includes a memory coupled to said third system interface through a third local bus;
   wherein said first system interface is configured to transmit a transaction request to perform an operation upon said memory of said third node through said global interconnect network to said second system interface; and
   wherein said second system interface is programmable to identify said second node as a pass through node for transactions received via said global interconnect network which are directed to a first slice of memory, and wherein said second system interface is configured to generate a pass through transaction corresponding to a first transaction request received upon said global interconnect network in response to detecting said first transaction request is directed to said first slice of memory, wherein said pass through transaction is directed to said third node.

2. The multiprocessing computer system as recited in claim 1, wherein said transaction request conveyed upon said first system interface to said second system interface includes a field which identifies said third node as a recipient for said transaction request.

3. The multiprocessing computer system of claim 2, wherein said second system interface includes configuration information for determining whether a designated transaction request is to be passed through to another node.

4. The multiprocessing computer system of claim 2, wherein said second system interface includes a configuration register to store information identifying designated addresses for which transaction requests are passed through said second system interface.

5. The multiprocessing computer system of claim 1, wherein said second node is configured to initiate a pass through transaction upon said second local bus in response to receiving said transaction request.

6. The multiprocessing computer system of claim 5, wherein pass through transactions initiated upon said second local bus by said second system interface are distinguished from other transactions initiated upon said second local bus.

7. The multiprocessing computer system of claim 6, wherein said pass through transactions are distinguished using a dedicated address bit conveyed upon said second local bus.

8. The multiprocessing computer system of claim 1, wherein said first, said second, and said third nodes are configurable to operate in either a cluster mode or an SSM mode.

9. A multiprocessing computer system comprising:
   a first node including a processor coupled to a memory through a first local bus, wherein said first node further includes a first system interface coupled to said first local bus and configured to receive transactions initiated by said processor upon said first local bus which are destined to remote nodes;
   a second node including a second system interface coupled to said first system interface through a global interconnect network, wherein said second node includes a second local bus, and wherein said second node further includes a third system interface coupled to said second local bus; and
   a third node including a fourth system interface coupled to said third system interface through said global interconnect network, and wherein said third node includes a memory coupled to said fourth system interface through a third local bus;

wherein said first system interface is configured to transmit a transaction request to perform an operation upon said memory of said third node through said global interconnect network to said second system interface;

wherein said second system interface is programmable to identify said second node as a pass through node for transactions received via said global interconnect network which are directed to a first slice of memory, and wherein said second system interface is configured to generate a pass through transaction corresponding to a first transaction request received upon said global interconnect network in response to detecting said first transaction request is directed to said first slice of memory, wherein said pass through transaction is conveyed upon said second local bus;

wherein said third system interface is configured to receive said transaction request from said second local bus and to transfer said transaction request to said fourth system interface through said global interconnect structure.

10. The multiprocessing computer system as recited in claim 9, wherein said transaction request conveyed upon said first system interface to said second system interface includes a field which identifies said third node as a recipient for said transaction request.

11. The multiprocessing computer system of claim 10, wherein said second system interface includes configuration information for determining whether a designated transaction request is to be passed through to another node.

12. The multiprocessing computer system of claim 10, wherein said second system interface includes a configuration register to store information identifying designated addresses for which transaction requests are passed through said second system interface.

13. The multiprocessing computer system of claim. 9, wherein said second system interface is configured to initiate a pass through transaction upon said second local bus in response to receiving said transaction request.

14. The multiprocessing computer system of claim 13, wherein pass through transactions initiated upon said second local bus by said second system interface are distinguished from other transactions initiated upon said second local bus.

15. The multiprocessing computer system of claim 14, wherein said pass through transactions are distinguished using a dedicated address bit conveyed upon said second local bus.

16. The multiprocessing computer system of claim 10, wherein said first, said second, and said third nodes are configurable to operate in either a cluster mode or an SSM mode.

17. A multiprocessing computer system operable in a cluster mode and including a plurality of cluster nodes interconnected by a global network, said multiprocessing computer system comprising:

a first cluster node conveying a transaction on said global network directed to a second cluster node;

an intermediary cluster node which receives said transaction from said first cluster node over said global network, identifies said transaction as being directed to a slice of memory corresponding to a pass through transaction, and responsively conveys said transaction to said second cluster node over another channel of said global network.

18. The multiprocessing computer system of claim 1, wherein said second system interface is further programmable to indicate which nodes of said computer system from which transactions may be received and processed.

19. The multiprocessing computer system of claim 9, wherein said second system interface is further programmable to indicate which nodes of said computer system from which transactions may be received and processed.

* * * * *